(12) United States Patent
Palmer et al.

(10) Patent No.: US 12,680,454 B2
(45) Date of Patent: *Jul. 14, 2026

(54) HIGH EFFICIENCY POWER PRODUCTION METHODS, ASSEMBLIES, AND SYSTEMS

(71) Applicant: 8 RIVERS CAPITAL, LLC, Durham, NC (US)

(72) Inventors: Miles R. Palmer, Durham, NC (US); Jeremy Eron Fetvedt, Raleigh, NC (US); Rodney John Allam, Lanhill (GB)

(73) Assignee: 8 RIVERS CAPITAL, LLC, Durham, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/077,870

(22) Filed: Mar. 12, 2025

(65) Prior Publication Data

US 2025/0243764 A1 Jul. 31, 2025

Related U.S. Application Data

(63) Continuation of application No. 18/514,608, filed on Nov. 20, 2023, now Pat. No. 12,264,596, which is a
(Continued)

(51) Int. Cl.
*F02C 9/26* (2006.01)
*F01D 5/08* (2006.01)
(Continued)

(52) U.S. Cl.
CPC ............. *F01D 5/183* (2013.01); *F01D 5/085* (2013.01); *F01D 5/182* (2013.01); *F01D 5/282* (2013.01);
(Continued)

(58) Field of Classification Search
CPC ......... F02C 9/26; F02C 9/28; F05D 2270/083
See application file for complete search history.

(56) References Cited

U.S. PATENT DOCUMENTS 3,656,566 A * 4/1972 Coast ....................... G21D 5/06
376/394
4,148,185 A * 4/1979 Somers ..................... F02C 3/22
60/39.465
(Continued)

OTHER PUBLICATIONS

Halliwell, "Fuel Burn Benefits of a Variable-Pitch Geared Fan Engine", 2012, American Institute of Aeronautics and Astronautics, pp. 14-17. (Year: 2012).*
(Continued)

*Primary Examiner* — Thuyhang N Nguyen
(74) *Attorney, Agent, or Firm* — Womble Bond Dickinson (US) LLP

(57) ABSTRACT

The present disclosure provides methods, assemblies, and systems for power production that can allow for increased efficiency and lower cost components arising from the control, reduction, or elimination of turbine blade mechanical erosion by particulates or chemical erosion by gases in a combustion product flow. The methods, assemblies, and systems can include the use of turbine blades that operate with a blade velocity that is significantly reduced in relation to conventional turbines used in typical power production systems. The methods and systems also can make use of a recycled circulating fluid for transpiration protection of the turbine and/or other components. Further, recycled circulating fluid may be employed to provide cleaning materials to the turbine.

18 Claims, 12 Drawing Sheets

Related U.S. Application Data continuation of application No. 17/896,901, filed on Aug. 26, 2022, now Pat. No. 11,859,496, which is a continuation of application No. 17/149,245, filed on Jan. 14, 2021, now Pat. No. 11,459,896, which is a continuation of application No. 14/341,327, filed on Jul. 25, 2014, now Pat. No. 10,927,679, which is a continuation of application No. 13/236,240, filed on Sep. 19, 2011, now abandoned.

(60) Provisional application No. 61/437,330, filed on Jan. 28, 2011, provisional application No. 61/385,039, filed on Sep. 21, 2010, provisional application No. 61/385,047, filed on Sep. 21, 2010.

(51) Int. Cl.

| | |
|---|---|
| *F01D 5/18* | (2006.01) |
| *F01D 5/28* | (2006.01) |
| *F01D 25/14* | (2006.01) |
| *F02C 3/34* | (2006.01) |
| *F02C 9/28* | (2006.01) |

(52) U.S. Cl.
CPC ................ *F01D 25/14* (2013.01); *F02C 3/34* (2013.01); *F02C 9/26* (2013.01); *F02C 9/28* (2013.01); *F05D 2220/32* (2013.01); *F05D 2230/22* (2013.01); *F05D 2260/203* (2013.01); *F05D 2260/95* (2013.01); *F05D 2300/702* (2013.01)

(56) References Cited

U.S. PATENT DOCUMENTS

| | | | | |
|---|---|---|---|---|
| 5,533,329 | A * | 7/1996 | Ohyama | F23R 3/26 |
| | | | | 60/773 |
| 6,237,323 | B1 * | 5/2001 | Ojiro | F23R 3/26 |
| | | | | 60/39.23 |
| 7,802,429 | B2 * | 9/2010 | Yokoyama | F02C 7/24 |
| | | | | 60/605.1 |
| 2006/0127827 | A1 * | 6/2006 | Yoshida | F23C 7/004 |
| | | | | 431/18 |
| 2009/0056335 | A1 * | 3/2009 | Myers | F02C 9/263 |
| | | | | 60/737 |
| 2009/0180939 | A1 * | 7/2009 | Hagen | F23R 3/28 |
| | | | | 422/600 |

OTHER PUBLICATIONS

English, Silvern, and Davison, "Research Memorandum", National Advisory Committee for Aeronautics, 1952, pp. 17-19. (Year: 1952).*

Kurzke, J., "The Mission Defines the Cycle: Turbojet, Turbofan and Variable Cycle Engines for High Speed Propulsion". Sep. 1, 2010. <https://apps.dtic.mil/sti/html/tr/ADA596249/> (Year: 2010).*

Sirignano, W.A. , Liu, F. , "Performance Increases for Gas-Turbine Engines". University of California, Irvine, Irvine, California 92697 Journal of Propulsion and Power vol. 15, No. 1, Jan.-Feb. 1999 (Year: 1999).*

U.S. Appl. No. 13/236,240, filed Sep. 19, 2011, Palmer et al.
U.S. Appl. No. 14/341,327, filed Jul. 25, 2014, Palmer et al.
U.S. Appl. No. 17/149,245, filed Jan. 14, 2021, Palmer et al.
U.S. Appl. No. 17/896,901, filed Aug. 26, 2022, Palmer et al.
U.S. Appl. No. 18/514,608, filed Nov. 20, 2023, Palmer et al.

* cited by examiner

CALCULATED ASH PARTICLE TRAJECTORY
100 MICRON PARTICLE 75 m/s INITIAL WITH 2 m/s TRANSPIRATION FLOW
300 BAR CO2 FLOW AT 700°

1

HIGH EFFICIENCY POWER PRODUCTION METHODS, ASSEMBLIES, AND SYSTEMS

CROSS-REFERENCE TO RELATED APPLICATIONS

This application is a continuation of U.S. patent application Ser. No. 18/514,608, filed Nov. 20, 2023, which is a continuation of U.S. patent application Ser. No. 17/896,901, filed Aug. 26, 2022, which is a continuation of U.S. patent application Ser. No. 17/149,245, filed Jan. 14, 2021, which is a continuation of U.S. patent application Ser. No. 14/341, 327, filed Jul. 25, 2014, which is a division of U.S. patent application Ser. No. 13/236,240, filed Sep. 19, 2011, and claims the benefit of U.S. Provisional Patent Application No. 61/385,039, which was filed on Sep. 21, 2010, U.S. Provisional Patent Application No. 61/385,047, which was filed on Sep. 21, 2010, and U.S. Provisional Patent Application No. 61/437,330, which was filed on Jan. 28, 2011. The disclosures of the referenced applications are hereby incorporated herein in their entirety by reference.

FIELD OF THE ENDEAVOR

The present disclosure provides turbine and combustor components that may be used in power production methods and systems. The disclosure also provides methods of using such turbine and combustor components in power production.

BACKGROUND

Gas turbines are routinely used in power production systems and methods to extract energy from a flow of combustion gases that is directed across blades present in the turbine to spin a turbine shaft. Energy may be extracted from the rotating shaft by an electrical generator to provide power in the form of electricity. Due to the extreme conditions (e.g., high temperatures and presence of erosive and/or corrosive materials) under which gas turbines are operated in typical power production plants (e.g., coal burning power plants), gas turbine components are typically formed of high performance materials. Thus, gas turbines often are high cost components of power production facilities.

Existing turbines may operate with inlet temperatures from about 1200° C. to about 1400° C. with blade temperatures from about 900° C. to about 1000° C. Thus, gas turbines operating in power production facilities typically require the use of superalloy materials to withstand the high temperatures. Moreover, for most advanced applications, blade cooling also is required along with the use of advanced fabrication technology, such as directionally solidified materials and even single crystal blade technology. Blade cooling is used to help improve turbine temperature tolerance, and thus efficiency, but this process has been limited by the fact that only air, or in some cases steam, has been available for cooling. The quantity of air available for cooling is limited by the amount of energy available to compress and pump the air and sometimes steam through the turbine blades. Moreover, the air typically is provided at a limited pressure—e.g., close to atmospheric pressure—and thus has limited heat transfer capabilities, even at high flow rates. Further, air contains large amounts of oxygen, which is highly reactive at high temperatures, and this is another factor that tends to require that turbine blade metallurgy be restricted to highly oxidation resistant materials, such as superalloys. Thus, despite the use of advanced materials and cooling, gas turbine blades still are plagued by oxidative and in some cases steam degradation.

While fossil fuel sources are being depleted, there remain vast reserves of coal that could be used in power production, but combustion of such solid fuels results not only in pollution but also particulates that can cause damage to components of power production systems, particularly turbine blades. Such damage particularly arises from particles in combustion product flows impacting turbine blades at high velocities—e.g., up to and exceeding 600 mph (268 m/s). Previous attempts to mitigate such damage have included the requirement for filtration systems to remove particulates from combustion product flows prior to passage through the turbine, as well as the use of high performance materials in blade construction, as noted above. Such requirements, however, increase the cost of power production systems. Moreover, such requirements increase the complexity of power production systems and can reduce efficiency of the power production methods. Accordingly, there is a need for improved gas turbine blade technology that overcomes at least the foregoing limitations in the art.

SUMMARY OF THE DISCLOSURE

The present disclosure provides methods, assemblies, and systems for power production that can allow for increased efficiency and lower cost components arising from the control, reduction, or elimination of turbine blade chemical degradation by air and steam and by mechanical erosion by particulates in a combustion product flow. The methods, assemblies, and systems can comprise the use of higher pressure fluid flows and/or turbine blades with increased total blade area that allow for a required power generation with a substantial reduction in blade velocity and in blade temperature. The disclosure particularly provides for turbines that are significantly smaller in at least one dimension and with cooler blades in comparison to turbines used in conventional power production systems. Such turbines particularly can be incorporated into a power production method or system. For example, the method or system can be one that incorporates the use of a high pressure, high recycle ratio circulating or working fluid, such as a $CO_2$ circulating fluid. Moreover, blade cooling technology can be combined with the blade design, operation pressure, and operation velocity to allow for customization of turbine operation within a range of temperatures, pressures, and speeds that control, reduce, or eliminate erosion arising from particle impingement or chemical degradation of the turbine blades. Particularly, the turbine blades can incorporate transpiration protection via passage of a transpiration fluid (e.g., the recycled working fluid) through the turbine blades. Such transpiration protection can include blade cooling, depending upon the temperature of the transpiration fluid used. Since the turbine blades can rotate at a significantly reduced velocity in relation to turbine blades in conventional power production systems, the disclosure may provide for reduction in erosion, increased blade lifetime, and reduction in blade strength requirements. Moreover, the inventive turbines may operate at higher efficiency and lower temperatures, which enables lower operating costs, longer in-service time, and lower fuel use.

In one particular embodiment, a method of power generation is provided. The method may comprise introducing a fuel, $O_2$, and a circulating fluid into a combustor, combusting the fuel in the combustor to provide a combustion product stream including the circulating fluid and a content of particulates, the combustion product stream flowing at a defined velocity, and expanding the combustion product stream across a turbine comprising a plurality of turbine blades to generate power and output a turbine discharge stream, the turbine being operated such that the turbine blades rotate at a blade velocity of less than about 500 mph.

The method may further comprise passing the turbine discharge stream through a filter configured to remove substantially all of the particulates contained in the turbine discharge stream and form a filtered turbine discharge stream. The method may also comprise passing the filtered turbine discharge stream through a heat exchanger to provide a cooled turbine discharge stream, treating the cooled turbine discharge stream to withdraw one or more components of the turbine discharge stream, and passing the treated turbine discharge stream back through the heat exchanger to provide a heated, recycled circulating fluid stream. The method may additionally comprise directing at least a portion of the heated, recycled circulating fluid stream to the combustor. Further, the method may comprise directing at least a portion of the heated, recycled circulating fluid stream to the turbine. Also, the method may comprise directing at least a portion of the heated, recycled circulating fluid stream to a cleaning material unit wherein the heated, recycled circulating fluid stream is combined with a cleaning material to form a cleaning material stream, the cleaning material in the cleaning material stream being configured to remove deposits on the turbine blades arising from the content of particulates present in the combustion product stream.

The cleaning material stream may be input directly into the turbine. Further, the cleaning material stream may be combined with the combustion product stream to form a combined combustion product and cleaning material stream that may be directed into the turbine. The circulating fluid may comprise $CO_2$, which may be provided in a supercritical state. Additionally, the method may include combining the filtered turbine discharge stream with a particulate sold fuel to form an additional fuel in the form of a slurry, and introducing the additional fuel to the combustor. Also, the method may include using at least a portion of the circulating fluid that is recycled as a transpiration fluid. Using the circulating fluid that is recycled as the transpiration fluid may comprise transpiring the transpiration fluid to an exterior surface of the turbine blades. Transpiring the transpiration fluid to the exterior surface of the turbine blades may comprise transpiring the transpiration fluid through a porous sintered material.

In another embodiment a power generation system is provided. The power generation system may comprise a combustor configured for receiving a fuel, $O_2$, and a circulating fluid, and having at least one combustion stage that combusts the fuel and provides a combustion product stream including the circulating fluid and a content of particulates, a turbine in fluid communication with the combustor, the turbine having an inlet for receiving the combustion product stream, an outlet for release of a turbine discharge stream, and a plurality of turbine blades of sufficient dimensions such that the turbine operates at a blade velocity of less than about 500 mph, and a filter in fluid communication with the outlet of the turbine and configured to produce a filtered turbine discharge stream.

The power generation system may further comprise a heat exchanger in fluid communication with the filter and configured to receive the filtered turbine discharge stream. The power generation system may also comprise a cleaning material unit in fluid communication with the heat exchanger, the cleaning material unit being configured to combine a cleaning material with a fluid stream received from the heat exchanger to form a cleaning material stream. The power generation system may additionally include a flow combiner switch configured to combine the cleaning material stream with the combustion product stream to form a combined combustion product and cleaning material stream and direct the combined combustion product and cleaning material stream to the turbine.

The blades may comprise a porous sintered material, and the porous sintered material may be configured to direct a transpiration fluid to an exterior surface of the blades. The porous sintered material may define the entirety of the exterior surface of the blades. Further, the turbine may comprise a rotor, and the rotor may comprise the porous sintered material and the porous sintered material may be configured to direct the transpiration fluid to an exterior surface of the rotor.

In another embodiment a method of power generation is provided. The method may comprise introducing a fuel, $O_2$, and a $CO_2$ circulating fluid into a combustor, combusting the fuel to provide a combustion product stream comprising $CO_2$, expanding the combustion product stream across a turbine to generate power and output a turbine discharge stream, processing the turbine discharge stream to recycle at least a portion of the $CO_2$ circulating fluid into the combustor, withdrawing a portion of the $CO_2$ circulating fluid that is recycled, and using the recycled $CO_2$ circulating fluid as a transpiration fluid.

Using the recycled $CO_2$ circulating fluid as the transpiration fluid may comprise transpiring the recycled $CO_2$ circulating fluid in the turbine. Using the recycled $CO_2$ circulating fluid as the transpiration fluid may comprise transpiring the recycled $CO_2$ circulating in the combustor. The method may further comprise directing the combustion product stream from the combustor through a conduit to the turbine, and using the recycled $CO_2$ circulating fluid as the transpiration fluid may comprise transpiring the recycled $CO_2$ circulating fluid in the conduit. The method may also include conditioning the recycled $CO_2$ circulating fluid to a temperature that is less than a temperature of the combustion product stream. The method may additionally include conditioning the recycled $CO_2$ circulating fluid to a temperature that is substantially equal to a temperature of the combustion product stream. Also, the method may include conditioning the recycled $CO_2$ circulating fluid to a temperature that is greater than a temperature of the combustion product stream.

In another embodiment a power generation system is provided. The system may comprise: a combustor configured for receiving a fuel, $O_2$, and a $CO_2$ circulating fluid stream and having at least one combustion stage that combusts the fuel in the presence of the $CO_2$ circulating fluid stream so as to provide a combustion product stream comprising $CO_2$; a turbine in fluid communication with the combustor, the turbine having an inlet for receiving the combustion product stream, an outlet for release of a turbine discharge stream comprising $CO_2$, and a plurality of turbine blades, wherein the combustion product stream acts on the turbine blades to rotate the turbine and generate power; and one or more components configured for processing the turbine discharge stream to form a recycled $CO_2$ circulating fluid stream; wherein one or more components of the system are configured for using a portion of the recycled $CO_2$ circulating fluid stream as a transpiration fluid.

The one or more components configured for processing the turbine discharge stream to form the recycled $CO_2$ circulating fluid stream may comprise a filter, a heat exchanger, a separator, and/or a compressor. The one or more components configured for using the portion of the recycled $CO_2$ circulating fluid stream as the transpiration fluid may comprise a porous sintered material configured for receiving the transpiration fluid therethrough. The turbine blades may have a blade height less than about 0.275 m. The turbine may comprise less than 2000 of the turbine blades. A ratio of a length of the turbine to an average diameter of the blades may be greater than 4.

In another embodiment a turbine assembly is provided. The assembly may comprise a plurality of components including a casing defining an inlet configured to receive a combustion product stream, and an outlet. The components may further comprise a rotor positioned in the casing, and a plurality of blades extending from the rotor, wherein one or more of the components comprise a porous sintered material, the porous sintered material configured to direct a transpiration fluid therethrough.

The porous sintered material may define the entirety of the exterior surface of the blades. The casing may comprise the porous sintered material and the porous sintered material may be configured to direct the transpiration fluid to an interior surface of the casing. The rotor may comprise the porous sintered material and the porous sintered material may be configured to direct the transpiration fluid to an exterior surface of the rotor. The rotor may comprise an annular flow diverter configured to divert the combustion product stream around the rotor. The assembly may further comprise an inlet conduit coupled to the inlet of the casing and configured to couple to an outlet of a combustor assembly and receive the combustion product stream therefrom, and the inlet conduit may comprise the porous sintered material and the porous sintered material may be configured to direct the transpiration fluid to an interior surface of the inlet conduit. The inlet of the casing may be configured to couple directly to an outlet of a combustor assembly. The inlet of the casing may be configured to receive the combustion product stream from a plurality of combustors radially disposed with respect to a major axis defined by the rotor.

The blades may comprise the porous sintered material, and the porous sintered material may be configured to direct the transpiration fluid to an exterior surface of the blades. The blades may respectively further comprise at least one reinforcement member. The reinforcement member may comprise a rod that extends through the porous sintered material in each of the blades. The reinforcement member may comprise a core, and the porous sintered material may extend around the core. The core may define one or more channels configured to receive the transpiration fluid and direct the transpiration fluid into the porous sintered material. One or more channels may be defined in the blades, and the channels may be configured to receive the transpiration fluid and direct the transpiration fluid into the porous sintered material. Each of the blades may extend from a leading edge to a trailing edge, and the blades may be configured to define a flow of the transpiration fluid at the leading edge that is greater than a flow of the transpiration fluid at the trailing edge. Each of the blades may define a transpiration fluid inlet area at the leading edge that is greater than a transpiration fluid inlet area at the trailing edge. Each of the blades may define a wall thickness that is greater at the trailing edge than at the leading edge. Each of the blades may extend from a root at the rotor to a tip, and the porous sintered material may define a porosity that varies between the root and the tip. The porosity of the porous sintered material may be configured to define a flow of the transpiration fluid at the tip that is greater than a flow of the transpiration fluid at the root. The porosity of the porous sintered material may be configured to define a flow of the transpiration fluid at the tip that is substantially equal to a flow of the transpiration fluid at the root. The porous sintered material may define a plurality of layers, wherein the porosity of the layers increases from the root to the tip. The blades may each respectively define an integral structure comprising a plurality of internal ribs.

The components of the turbine assembly may further comprise a plurality of stators, wherein the stators comprise the porous sintered material and the porous sintered material may be configured to direct the transpiration fluid to an exterior surface of the stators. The turbine assembly may further comprise one or more seals, wherein one or more of the components are configured to direct the transpiration fluid to the seals. The seals may comprise the porous sintered material.

In another embodiment a turbine assembly is provided. The turbine assembly may comprise a casing defining an inlet configured to receive a combustion product stream, and an outlet. The assembly may further comprise a rotor positioned in the casing, and a plurality of blades extending from the rotor, wherein a ratio of a length of the turbine assembly to the average diameter of the plurality of blades is greater than 4.

The turbine blades may have a blade height less than about 0.275 m. The turbine assembly may comprise less than 2000 of the blades. The blades may be transpiration protected. Further, the blades comprise a porous sintered material configured to direct a transpiration fluid to an exterior surface of the blades.

Other aspects and advantages of the present invention will become apparent from the following.

BRIEF DESCRIPTION OF THE FIGURES

Figure 1:
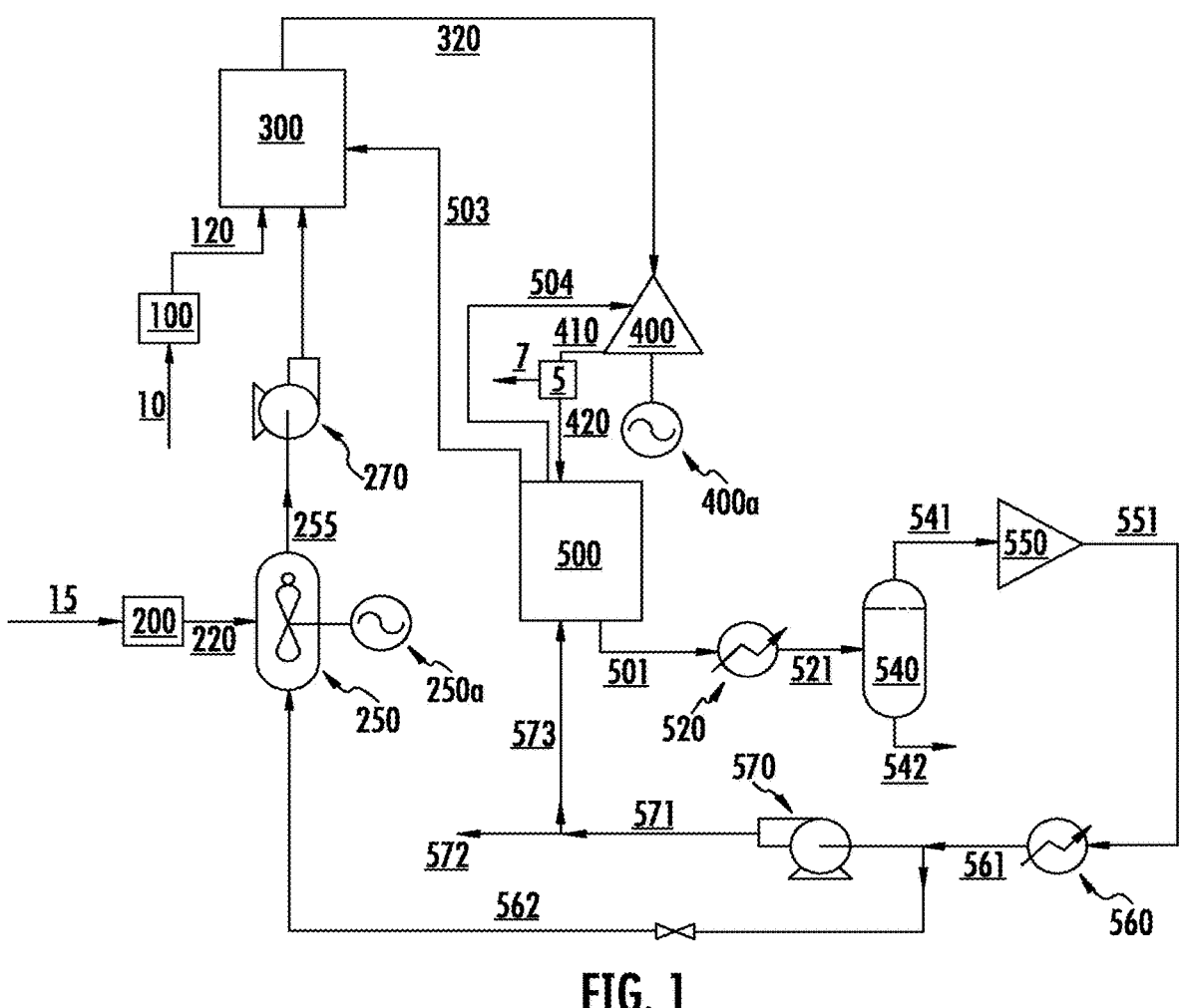
Figure 2:
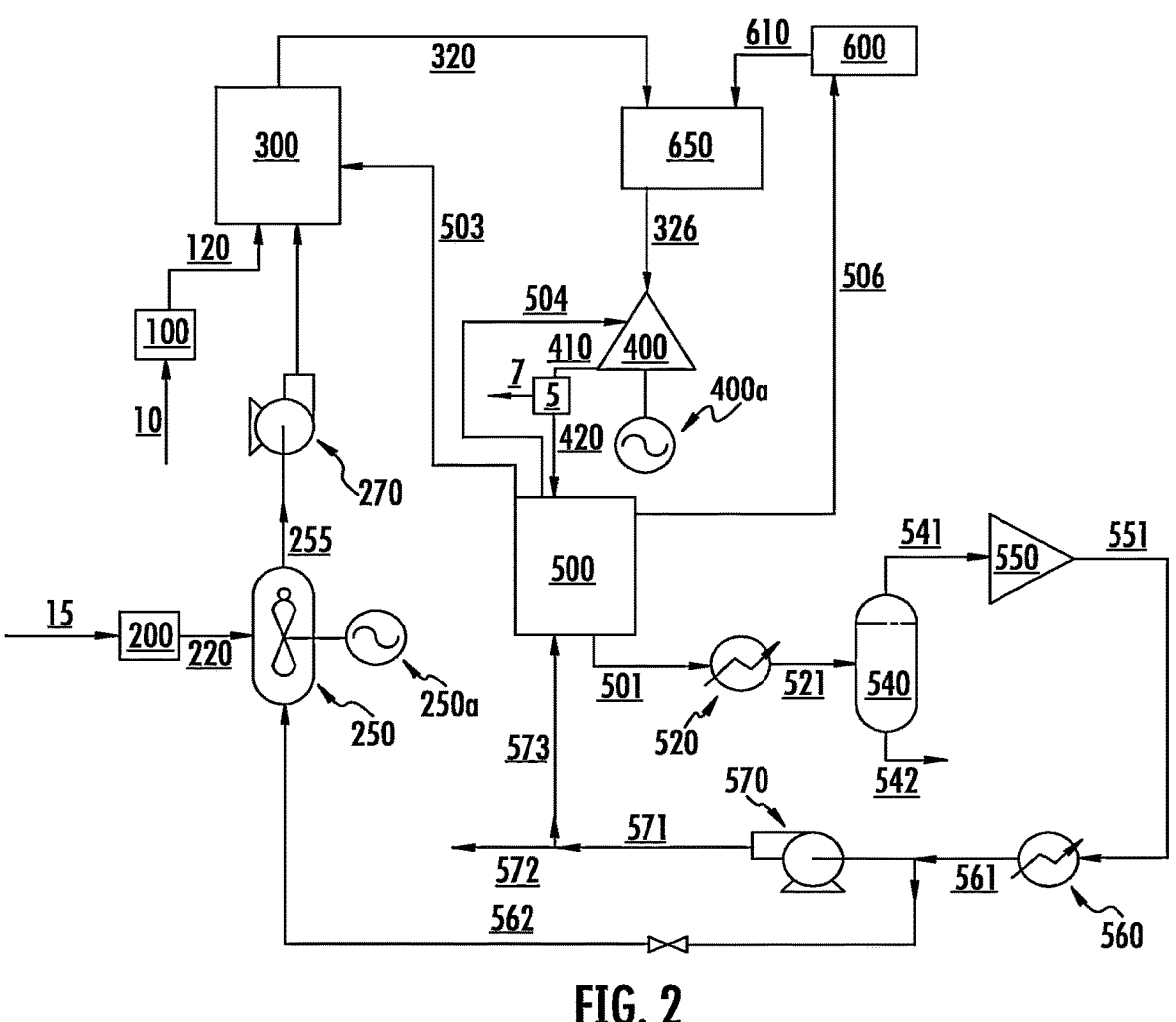
Figure 3:
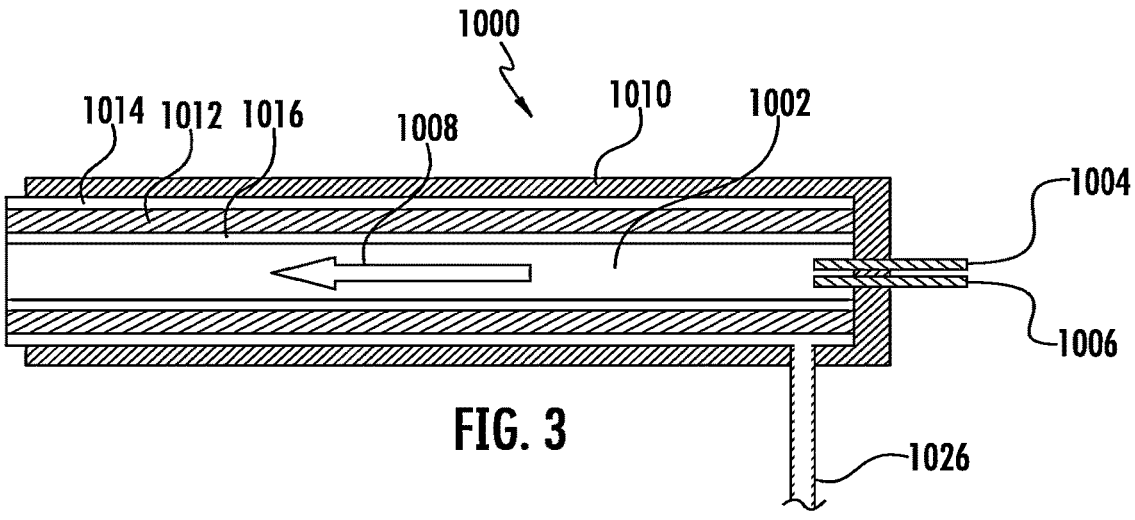
Figure 4:
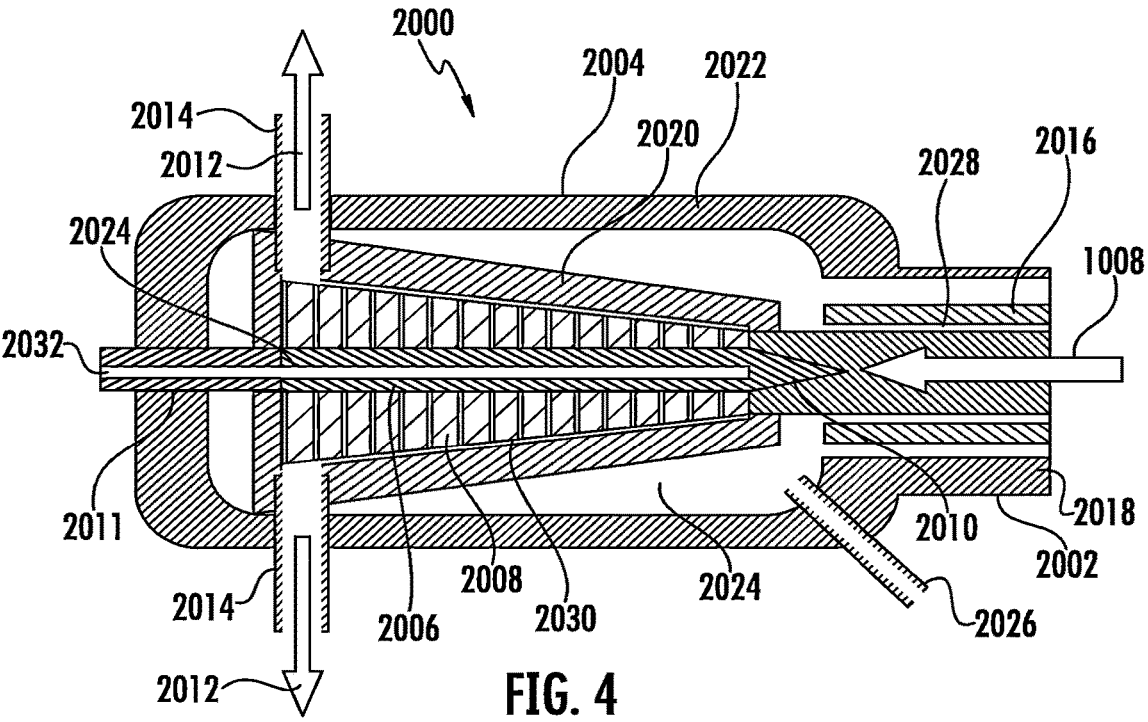
Figure 5:
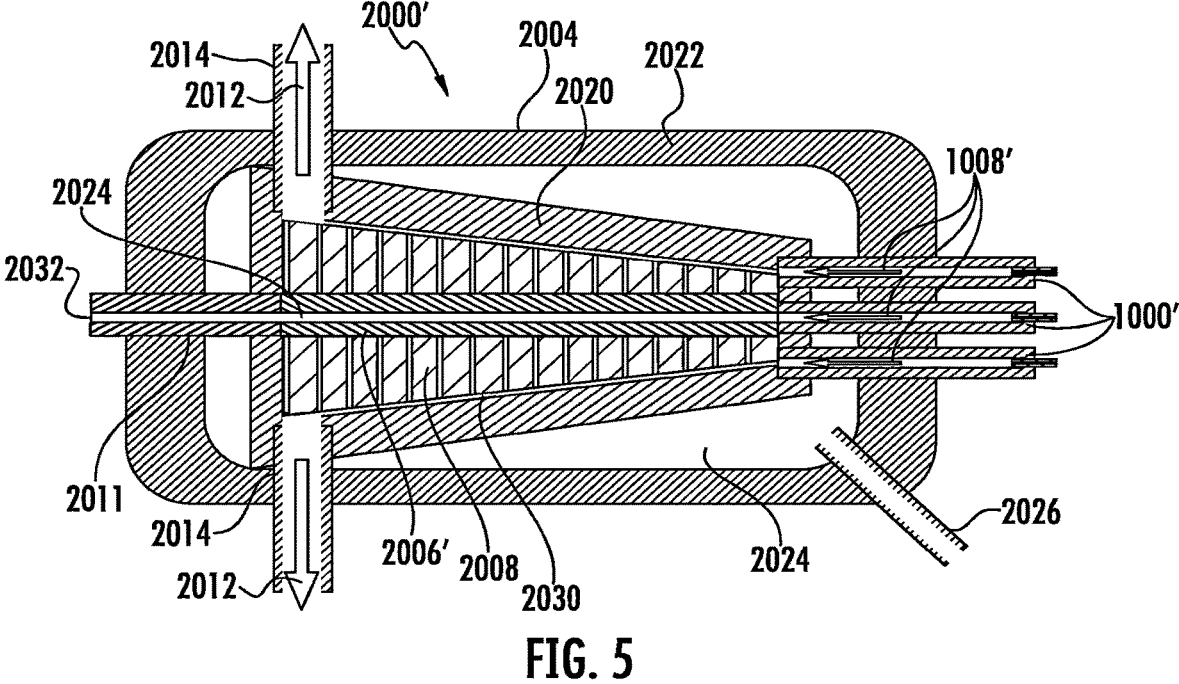
Figure 6:
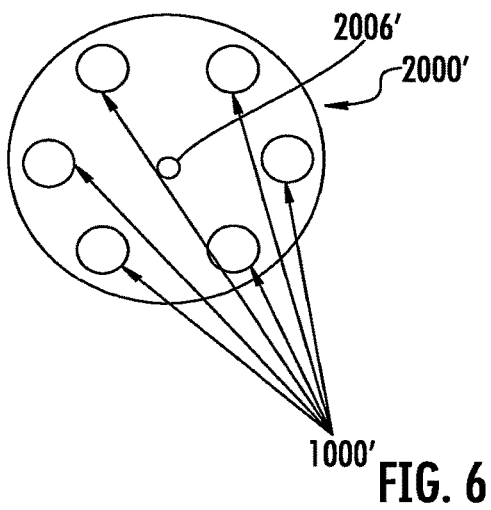
Figure 7:
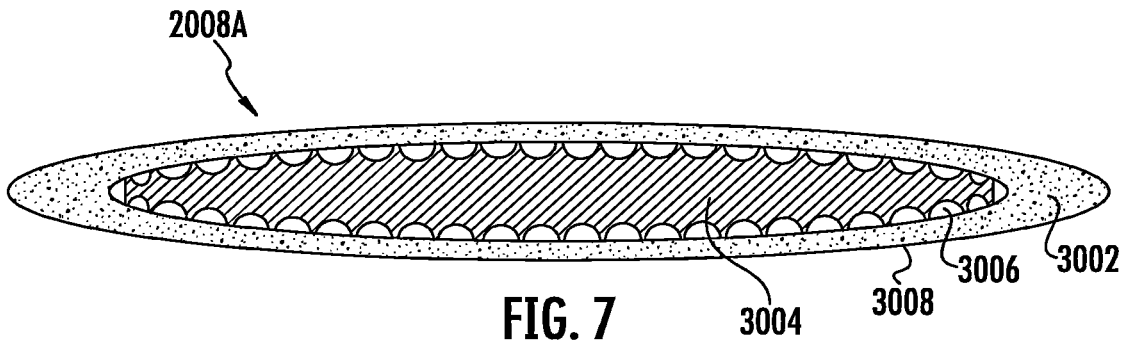
Figure 8:
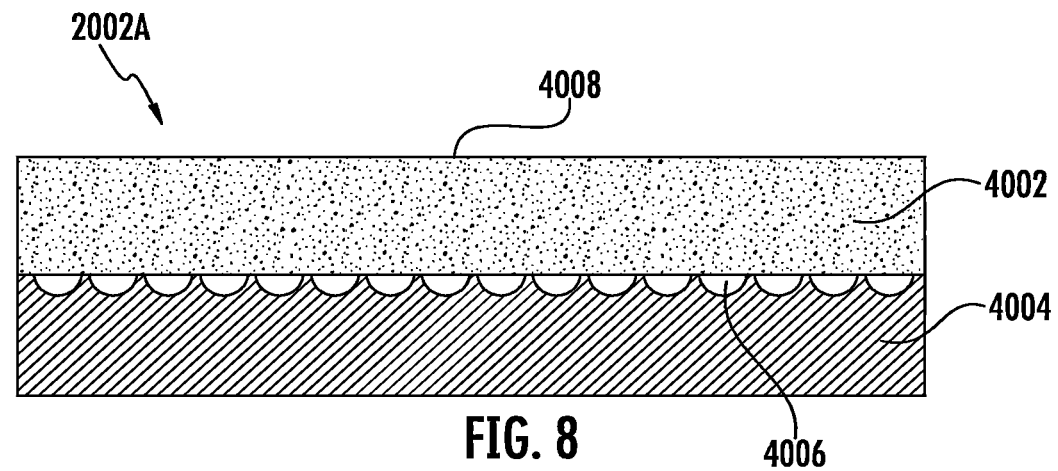
Figure 9:
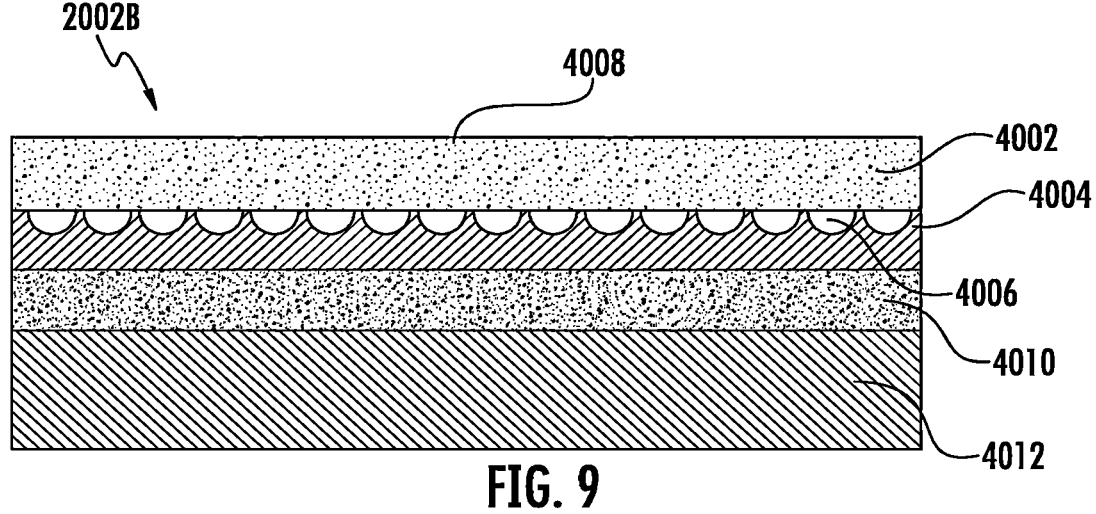
Figure 10:
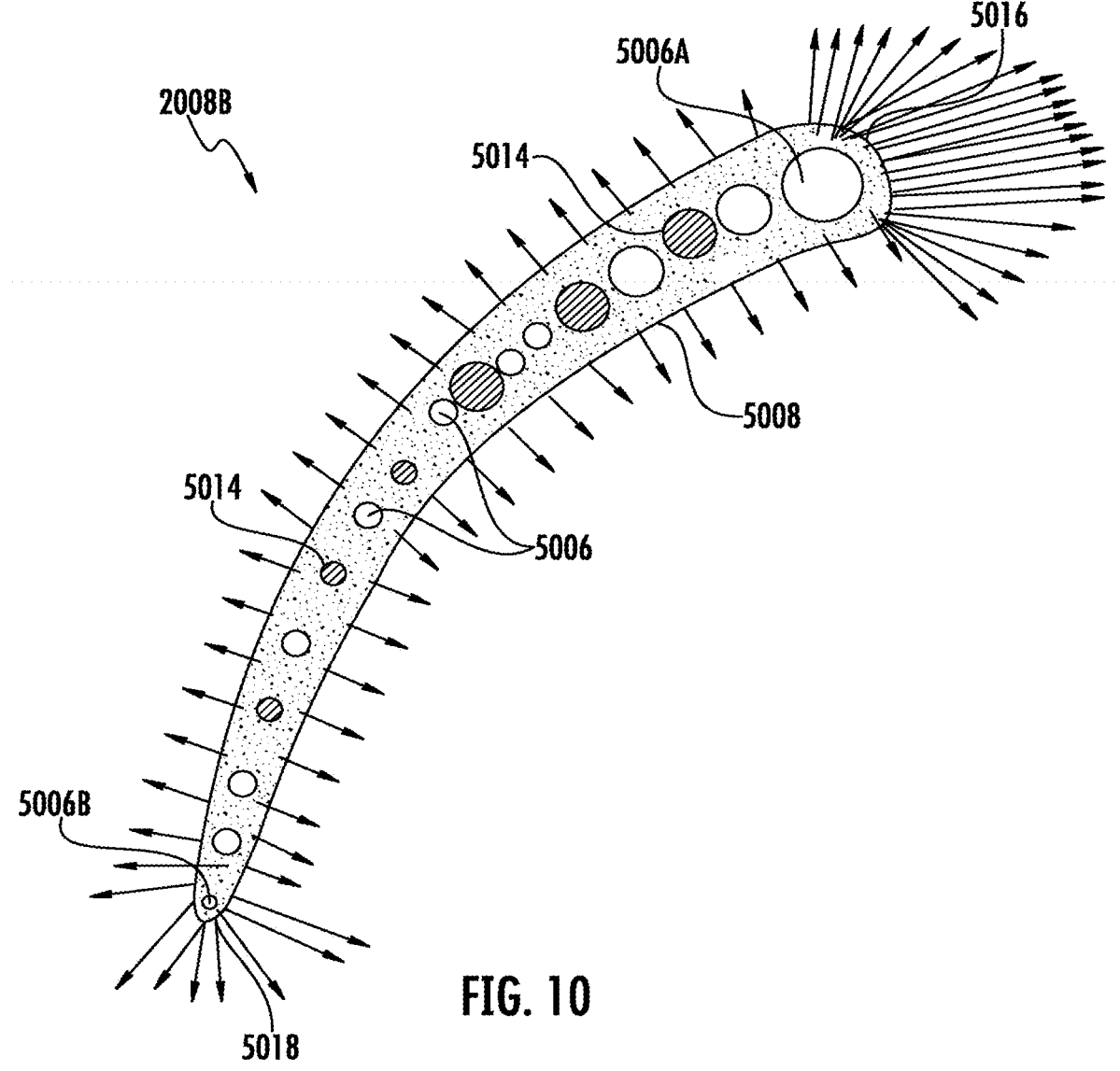
Figure 11:
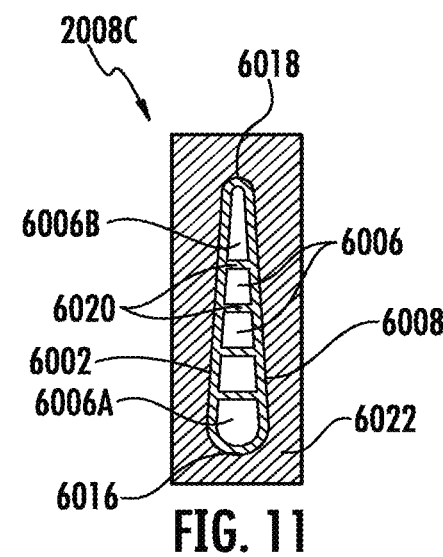
Figure 12:
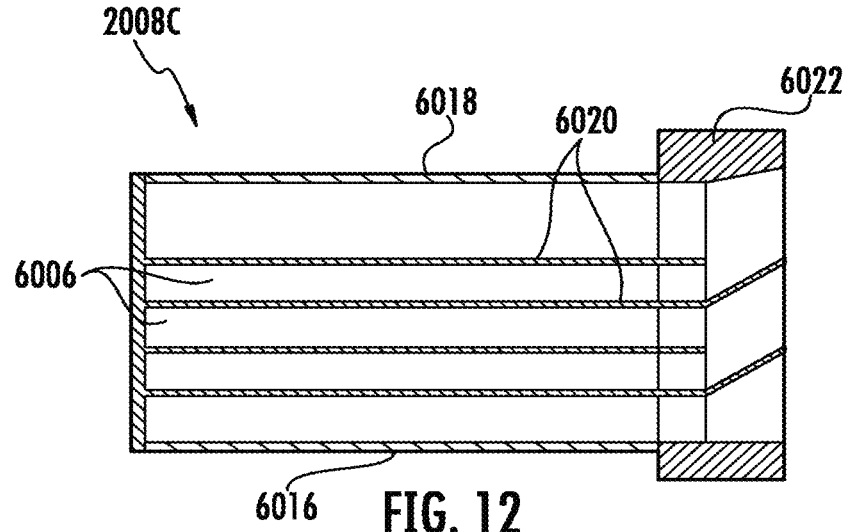
Figure 13:
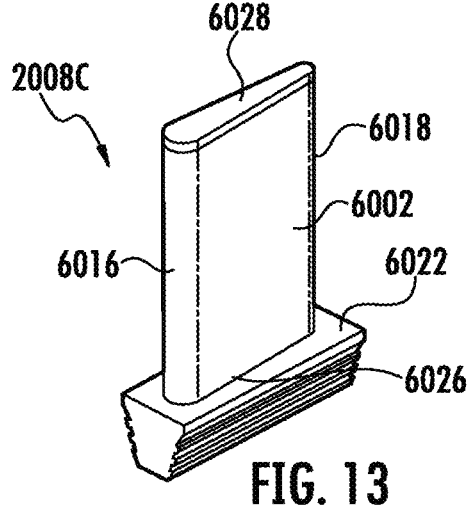
Figure 14:
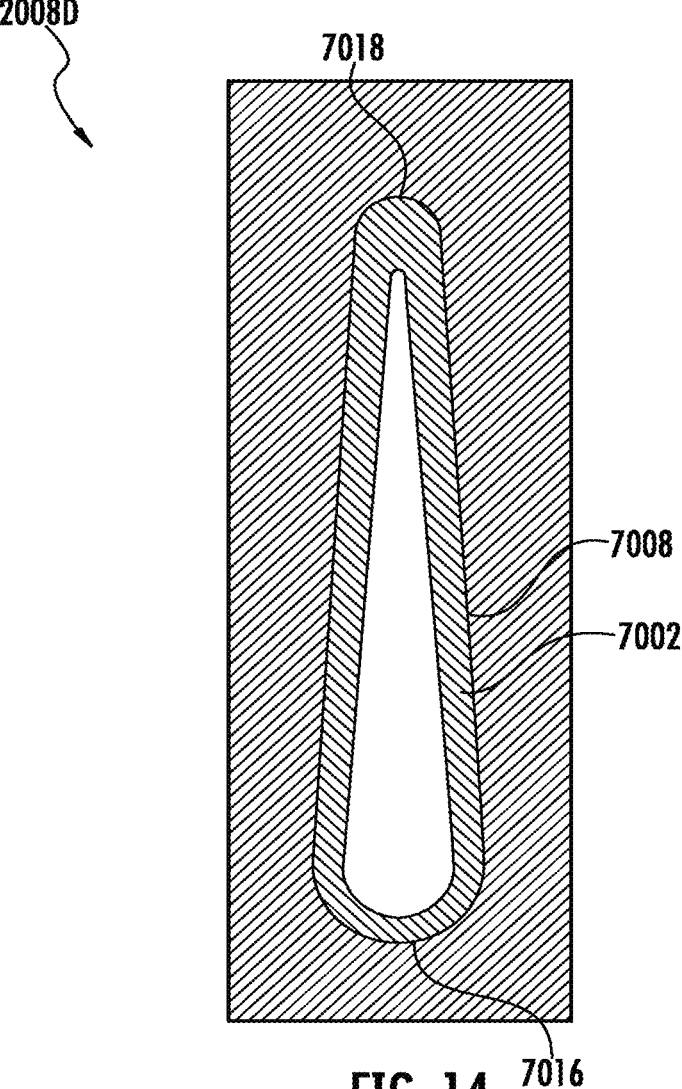
Figure 15A:
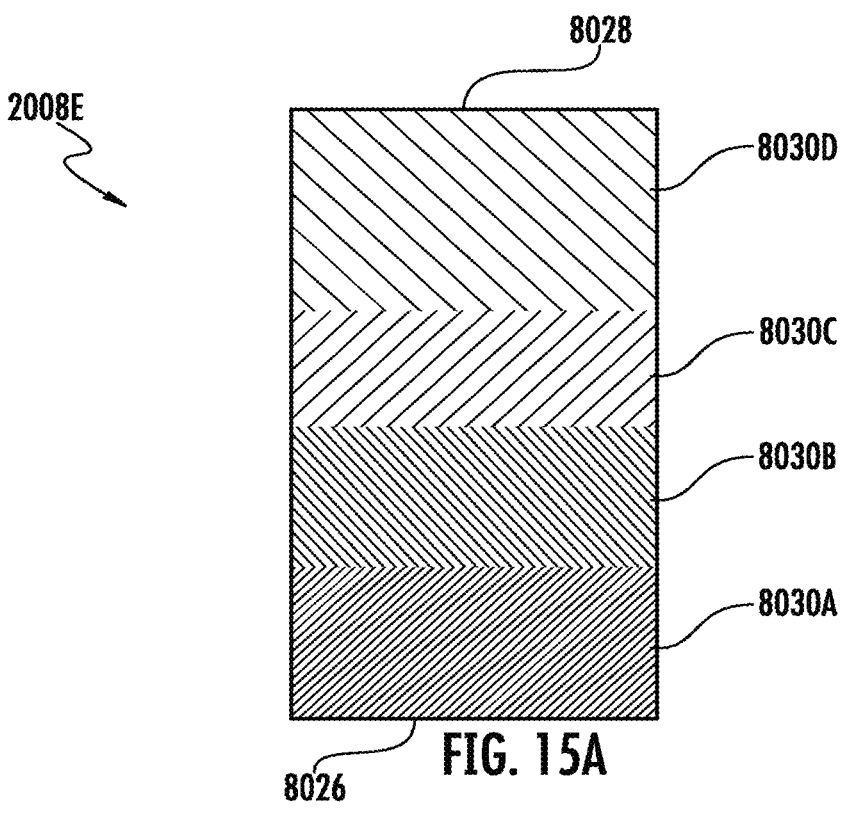
Figure 15B:
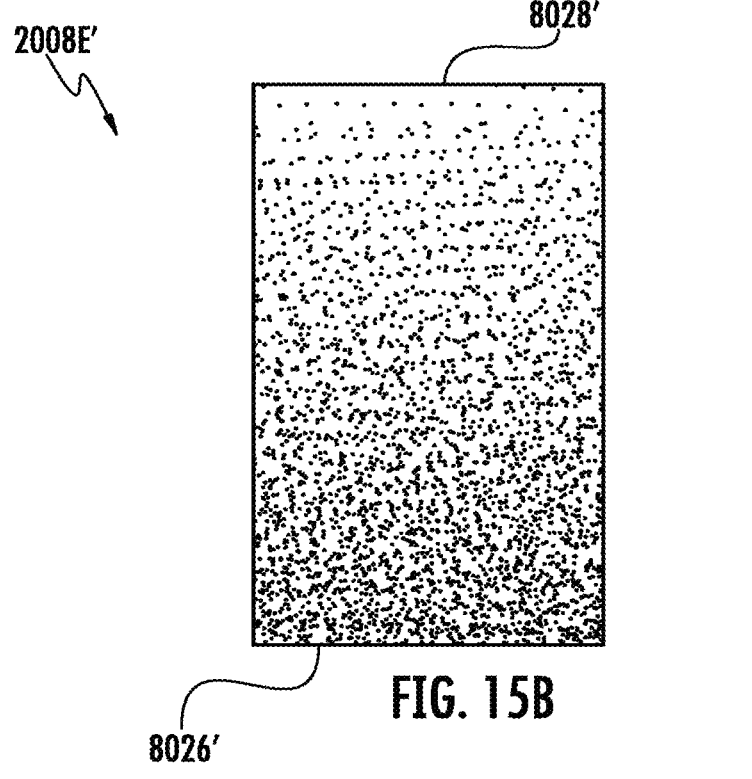
Figure 16:
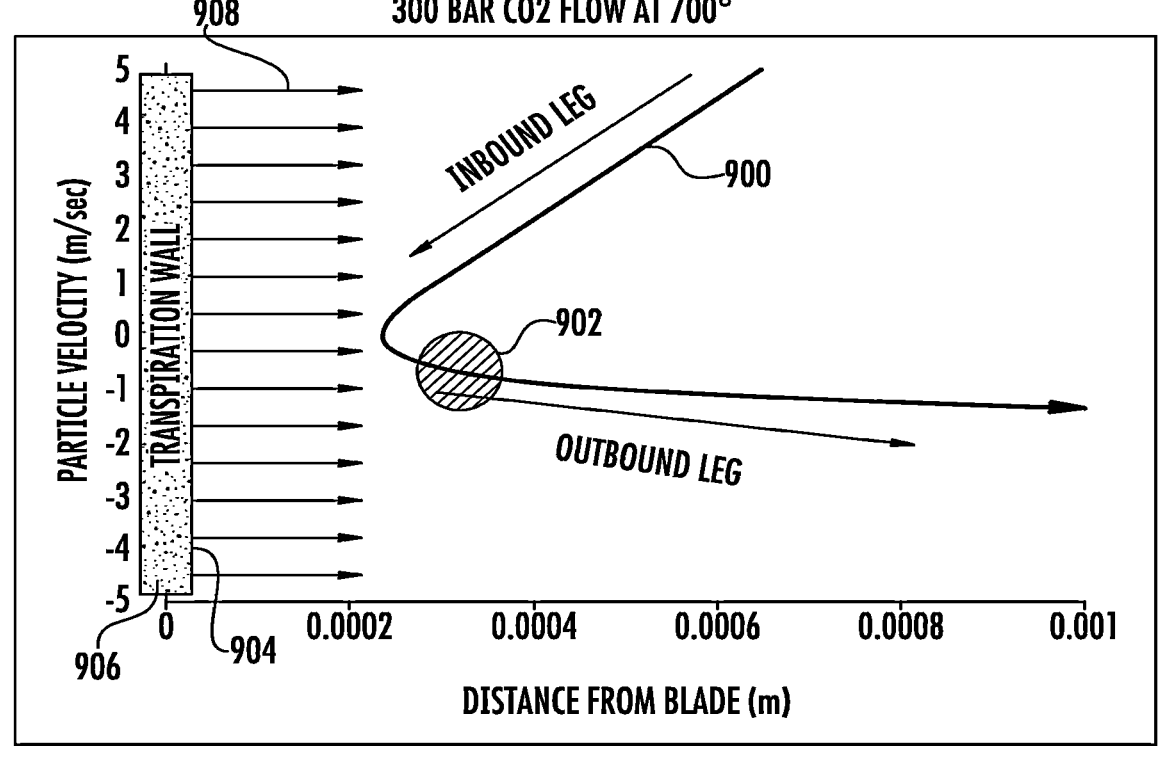
Figure 17:
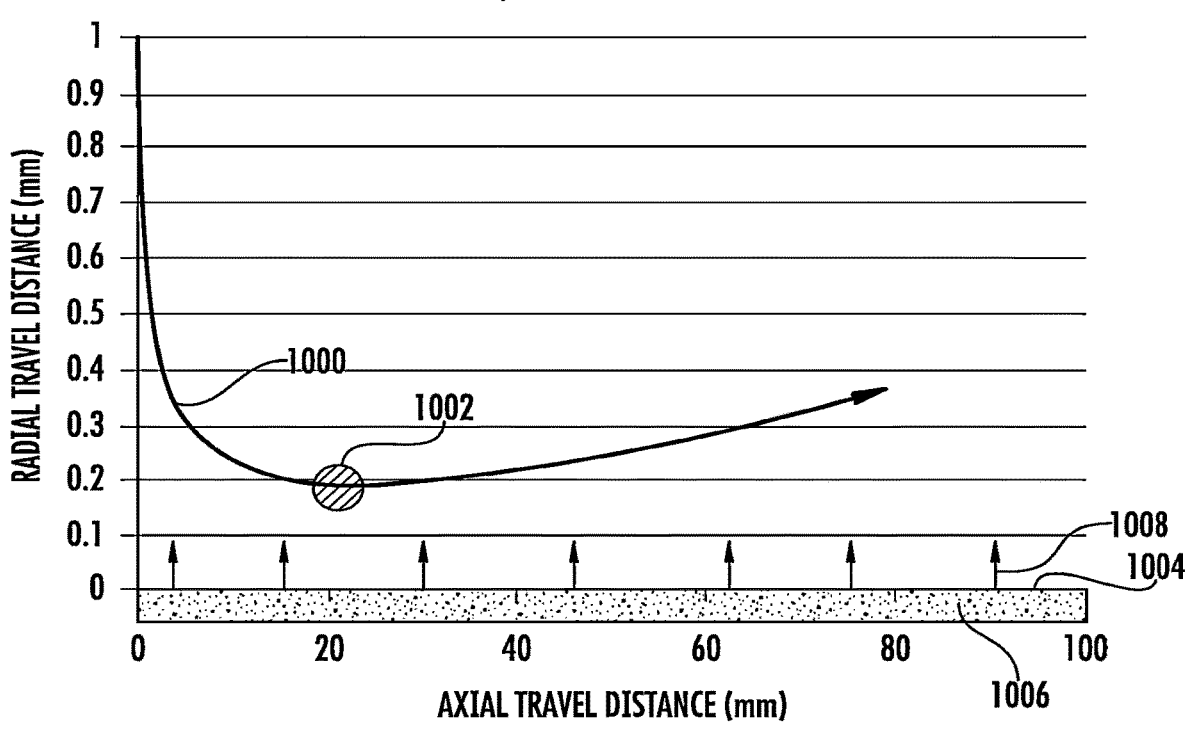
Figure 18:
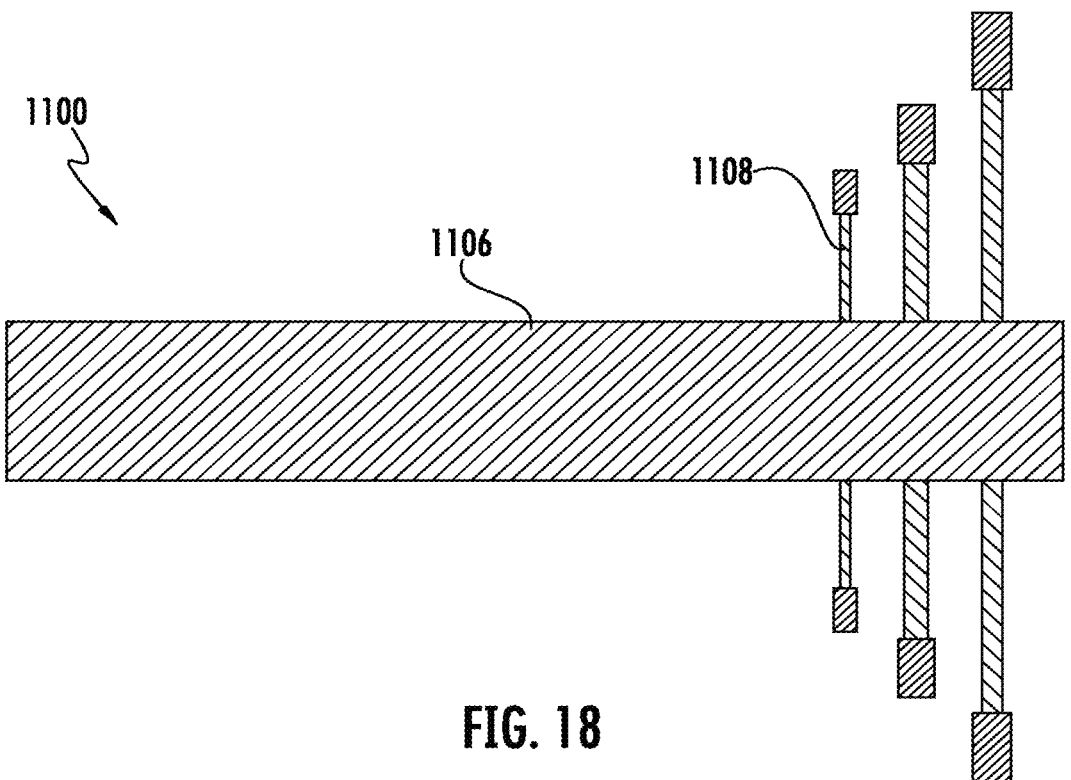
Figure 19:
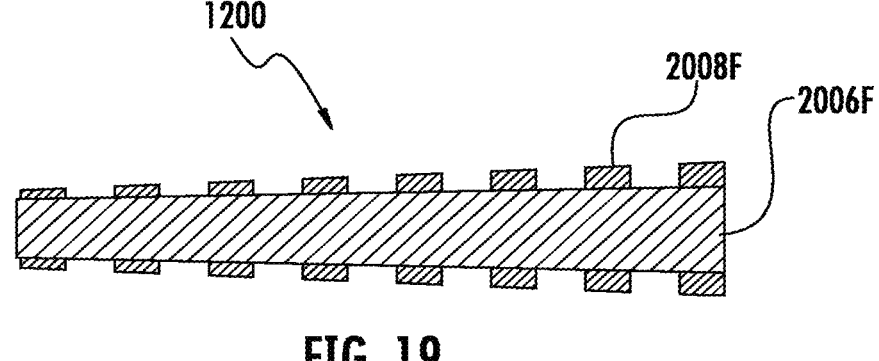

Having thus described the disclosure in general terms, reference will now be made to the accompanying figures, wherein:

FIG. 1 provides a flow diagram of a combustion cycle and system according to one example embodiment;

FIG. 2 provides a flow diagram of a combustion cycle and system according to a further example embodiment;

FIG. 3 provides a sectional view through a combustor in accordance with one example embodiment;

FIG. 4 provides a sectional view through a turbine including an inlet conduit in accordance with one example embodiment;

FIG. 5 provides a longitudinal sectional view through a turbine and a plurality of radially disposed combustors in accordance with one example embodiment;

FIG. 6 provides a lateral sectional view through the turbine and combustor system of FIG. 5;

FIG. 7 provides a lateral sectional view through a turbine including a core in accordance with one example embodiment;

FIG. 8 provides a partial sectional view through an inlet conduit comprising first and second layers in accordance with one example embodiment;

FIG. 9 provides a partial sectional view through an inlet conduit comprising four layers in accordance with one example embodiment;

FIG. 10 provides a sectional view between the leading and trailing edges of a turbine blade comprising reinforcement rods and channels configured to receive a transpiration fluid in accordance with one example embodiment;

FIG. 11 illustrates a sectional view between a leading edge and a trailing edge of a turbine blade including integral internal ribs defining channels configured to receive a transpiration fluid in accordance with one example embodiment;

FIG. 12 illustrates a sectional view between the tip and base member of the turbine blade of FIG. 11;

FIG. 13 illustrates a perspective view of the turbine blade of FIG. 11;

FIG. 14 illustrates a sectional view between a leading edge and a trailing edge of a turbine blade defining differing material thicknesses between the leading and trailing edges in accordance with one example embodiment;

FIG. 15A illustrates a partial sectional view between the root and tip of a turbine blade including layers of material defining differing porosities between the root and tip in accordance with one example embodiment;

FIG. 15B illustrates a partial sectional view between the root and tip of a turbine blade defining a porosity gradient between the root and tip in accordance with one example embodiment;

FIG. 16 illustrates a calculated particle trajectory for a particle in a turbine in accordance with one example embodiment;

FIG. 17 provides a graphical illustration of radial travel distance of particulates in a combustion product flow in a combustor as a function of axial travel distance in accordance with one example embodiment;

FIG. 18 illustrates a lengthwise cross-section of a conventional turbine for use in conventional natural gas power plant; and FIG. 19 illustrates a lengthwise cross-section of a turbine according to example embodiments that is generally smaller in size than a conventional turbine.

DETAILED DESCRIPTION

The disclosure now will be described more fully hereinafter through reference to various embodiments. These embodiments are provided so that this disclosure will be thorough and complete, and will fully convey the scope of the disclosure to those skilled in the art. Indeed, the disclosure may be embodied in many different forms and should not be construed as limited to the embodiments set forth herein; rather, these embodiments are provided so that this disclosure will satisfy applicable legal requirements. As used in the specification, and in the appended claims, the singular forms "a", "an", "the", include plural referents unless the context clearly dictates otherwise.

The present disclosure in one embodiment relates to turbine blade designs and methods of use that can reduce or even eliminate turbine blade erosion arising from chemical degradation by air or steam or by particle impingement. The disclosure also provides power production methods and systems that can provide high efficiency operation while reducing or even eliminating turbine blade erosion arising from particulates in a combustion product flow without the requirement of filtration prior to passage through the turbine. The reduction and/or elimination of blade erosion can simplify power production systems and increase possible feedstocks since it allows for the turbines to process combustion product flow with higher total particulate concentration and is thus particularly beneficial in combustion processes using feedstocks, such as coal, that include a relatively high concentration of particulates in the combustion product.

The terms "particulates" and "particles" (including such terms in the singular form) as used in relation to components of the combustion product stream specifically encompass solid and liquid materials present in the combustion product stream in a relatively small unit size typically understood to be characteristic of particles, specifically in relation to the overall volume of the combustion product stream. In some embodiments, particles or particulates may comprise any material in the combustion product stream that is in a non-gaseous state. Liquid particulates specifically may encompass materials that are liquid at the temperature of the combustion product stream but that are solid at a temperature that is less than the temperature of the combustion product stream, such as at least 10° C., at least 15° C., at least 20° C., at least 30° C., at least 50° C., or at least 100° C. less than the temperature of the combustion product stream. Such liquid particulates may have a freezing point that is at least ambient temperature, at least about 40° C., at least about 50° C., at least about 60° C., at least about 80° C., at least about 100° C., or at least about 200° C. In specific embodiments, the liquid particles may have a freezing point falling within any combination of the above-listed temperatures (e.g., within the range that is at least 10° C. less than the temperature of the combustion product stream and at least ambient temperature).

In particular embodiments, the present disclosure realizes that particle impact damage on turbine blades is related to blade velocity. In particular, a damage rate arising from particle impact can change as approximately the cube of blade velocity relative to particle velocity. In this regard, the standard alternating current frequency employed in the United States is 60 Hz. Further, power production systems in the United States typically drive synchronous alternating current generators that operate at either 1,800 rpm (30×60 Hz) or 3,600 rpm (60×60 Hz), although it should be understood that the turbines may rotate within other rpm ranges. In this regard, other countries may employ differing standard alternative current frequencies. For example, the United Kingdom operates at a frequency of 50 Hz. Further, generator systems may employ permanent magnet direct current generators driven at any speed such that the direct current is converted to alternating current having a desired frequency. Accordingly, it should be understood that the frequencies discussed herein are provided for example purposes only.

However, known gas turbines used in power production systems and methods including synchronous alternating current generators typically operate at blade speeds of 600 mph (268 m/s) or greater. At blade speeds typical in existing steam and gas turbines, the presence of even very small particulates in a combustion product flow can cause blade erosion. The present disclosure, however, has recognized the ability to overcome blade erosion through alterations in blade structure and operation that allows for decreased blade velocities. In specific embodiments, blade velocity according to the present disclosure may be from about 20 m/s to about 340 m/s at the blade tip. More specifically, the blade velocity may be below 200 m/s, below 100 m/s, or from about 50 m/s to about 75 m/s. In one embodiment, the disclosure can provide for turbine operation at a blade velocity that is about 3 times lower than typical (i.e., 200 mph (89 m/s)), which may result in a decrease in blade erosion rate of 27 fold or more. In one embodiment, a blade velocity of 150 mph (67 m/s)—i.e., a four-fold decrease from typical blade velocities—can provide approximately a 64 fold decrease in blade damage rate.

The ability to operate the turbine in a power production system at a lower velocity can arise from a variety of factors that can be embodied singularly or in multiple combinations. For example, the turbine blades can be designed with dimensions that can allow for the blade velocity to be slowed to a speed where particle impingement no longer causes erosion of the turbine blades. More specifically, the operating blade speed can be reduced below the critical velocity at which erosion occurs. In this regard, the blade speed at any given point on a blade is provided by the following formula:

$$v = (rpm/60) * 2 * \pi * r \qquad \text{(Formula 1)}$$

where:
    v=blade speed (m/s),
    rpm=rotations of the blade per minute,
    $\pi$=pi, and
    r=distance (m) between a center of the rotor and a point on the blade at which the blade velocity is to be determined (e.g., radius).

Note further that the blade speed at the tip of a blade is provided by the following formula:

$$v_t = (rpm/60) * 2 * \pi * (a + b) \qquad \text{(Formula 2)}$$

where:
    $v_t$=blade speed (m/s) at the tip of the blade,
    rpm=rotations of the blade per minute,
    $\pi$=pi,
    a=radius (m) of the rotor at the blade, and
    b=blade height (m).

Thus, the maximum blade speed for each blade may be reduced by decreasing the distance to which the blades extend from the center of the rotor. As discussed below, use of turbines having blades extending to relatively smaller radii may be enabled by employing a supercritical fluid having relatively high fluid density and high pressure at a moderate flow velocity in the turbine of the present disclosure. Further, employing a high density working fluid in the turbine may provide for significantly reduced turbine blade temperature by improving the ability of transpiration to cool the blades.

Blade height (i.e., the distance from a root at the outer surface of the turbine shaft (e.g. rotor) to the blade tip) preferably is less than about 0.275 m. In specific embodiments, average blade height can be about 0.05 m to about 0.25 m, about 0.075 m to about 0.225 m, about 0.1 m to about 0.2 m, or about 0.125 m to about 0.175 m. In specific embodiments, actual blade heights could vary from the turbine inlet to the turbine outlet. For example, blade height at the inlet could be lower than the average and increase toward the outlet such that blade height at the outlet is higher than the average. Average blade width can be about 0.025 m to about 0.125 m, about 0.04 m to about 0.11 m, about 0.05 m to about 0.1 m, or about 0.06 m to about 0.09 m. In other embodiments, blade height and width can be further dimensions that allow for operation at a velocity as described herein.

The inventive turbines and methods of operation also can be characterized by overall turbine dimensions. For example, a turbine according to the disclosure can have an overall length of less than about 11 m, less than about 10 m, or less than about 9 m. In further embodiments, overall turbine length can be about 6 m to about 10 m, about 6.5 m to about 9.5 m, about 7 m to about 9 m, or about 7.5 m to about 8.5 m. A turbine according to the disclosure can have an average diameter of less than about 3.5 m, less than about 3 m, or less than about 2.5 m. In further embodiments, average turbine diameter can be about 0.25 m to about 3 m, about 0.5 m to about 2 m, or about 0.5 m to about 1.5 m. The ratio of turbine length to turbine average diameter (i.e., diameter of the turbine blades) can be greater than about 3.5, greater than about 4, greater than about 4.5, or greater than about 5. In specific embodiments, the ratio of turbine length to turbine average diameter can be about 3.5 to about 7.5, about 4 to about 7, about 4.5 to about 6.5, or about 5 to about 6. The above ratios specifically can relate to the total length of the turbine. In some embodiments, total length may refer to the length of the casing from inlet to outlet. In certain embodiments, total length may refer to the distance within the casing from the turbine blade immediately adjacent the inlet to the turbine blade immediately adjacent the outlet.

The inventive turbines and methods of operation likewise can be characterized by average blade radius (center of the rotor to tip of the turbine blade). Preferably, the turbines operate with an average blade radius of less than about 1.2 m, less than about 1.1 m, less than about 1 m, less than about 0.9 m, less than about 0.8 m, less than about 0.7 m, or less than about 0.6 m. Turbine blade radius specifically can be about 0.25 m to about 1 m, about 0.275 m to about 0.8 m, about 0.3 m to about 0.7 m, about 0.325 m to about 0.6 m, about 0.35 m to about 0.5 m, or about 0.375 m to about 0.475 m.

In certain embodiments, a turbine useful according to the disclosure can have a total number of turbine blades that is significantly less than present in typical gas turbine systems. Specifically, the inventive turbines may have less than about 3,000 blades, less than about 2,500 blades, or less than about 2,000 blades. In further embodiments, the number of blades in a turbine can be about 500 to about 2,500, about 750 to about 2,250, about 1,000 to about 2,000, or about 1,250 to about 1,750.

In some embodiments, the turbines according to the disclosure particularly can provide high efficiency power production with reduced blade velocity through operation at significantly increased inlet pressure, and/or significantly increased outlet pressure, and/or significantly increased pressure drop from inlet to outlet in relation to typical gas turbine power production systems. In specific embodiments, the turbine can be operated at an inlet pressure of at least about 25 bars (2.5 MPa), at least about 50 bars (5 MPa), at least about 100 bars (10 MPa), at least about 150 bars (15 MPa), at least about 200 bars (20 MPa), or at least about 250 bars (25 MPa). In further embodiments, inlet pressure can be about 50 bars (5 MPa) to about 500 bars (50 MPa), about 100 bars (10 MPa) to about 450 bars (45 MPa), about 150 bars (15 MPa) to about 400 bars (40 MPa), about 200 bars (20 MPa) to about 400 bars (40 MPa), or about 250 bars (25 MPa) to about 350 bars (35 MPa).

In further embodiments, the turbine can be operated with an outlet pressure of at least about 5 bars (0.5 MPa), at least about 10 bars (1 MPa), at least about 15 bars (1.5 MPa), at least about 20 bars (2 MPa), or at least about 25 bars (2.5 MPa). The outlet pressure particularly may be about 10 bars (1 MPa) to about 50 bars (5 MPa), about 15 bars (1.5 MPa) to about 45 bars (4.5 MPa), about 20 bars (2 MPa) to about 40 bars (4 MPa), or about 25 bars (2.5 MPa) to about 35 bars (3.5 MPa).

In other embodiments, the ratio of turbine inlet pressure to turbine outlet pressure can be at least about 6, at least about 7, at least about 8, at least about 9, or at least about 10. In specific embodiments, the ratio of turbine inlet pressure to turbine outlet pressure can be about 6 to about 15, about 7 to about 14, about 8 to about 12, or about 9 to about 11.

In yet other embodiments, the turbines according to the disclosure can be operated in a power production system at a significantly increased flow density in relation to operation of turbines in typical power production systems. For example, the inventive turbines can be operated at a flow density of at least about 20 $kg/m^3$, at least about 50 $kg/m^3$, at least about 100 $kg/m^3$, at least about 150 $kg/m^3$, at least about 200 $kg/m^3$, or at least about 300 $kg/m^3$, at least about 400 $kg/m^3$, at least about 500 $kg/m^3$, or at least about 600 $kg/m^3$.

In contrast to the turbines in accordance with the present disclosure, existing gas turbine compressors may operate with outlet pressures from about 1 Bar (0.1 MPa) to about 15 Bar (1.5 MPa), with gas densities in the compressor section ranging from 1 $kg/m^3$ to about 15 $kg/m^3$ (assuming adiabatic compression heating). Erosion and other problems may not be severe in the compressor due to the relatively low temperatures therein. However, in the hot section, the gas temperature may vary from a peak of roughly 1727° C. to about 527° C. The density of the gas in the hot section may vary from a high of about 5 $kg/m^3$ to a low of about 0.5 $kg/m^3$. Thus, the conditions inside existing turbines may vary considerably from those within the turbines in accordance with the present disclosure.

The use of higher pressures at lower flow rates and higher temperatures may increase the torque on the turbine blades. Accordingly, the turbine may include features configured to reduce the torque applied to the blades. In particular, the turbine may include a larger number of blades, discs, and/or stages than conventional turbines, which distributes the torque therebetween to reduce the torque applied to the individual blades. Further, the blades may define an angle of attack configured to exert less force and torque on the blades. In particular, the blades may define a decreased angle with respect to the flow through the turbine, which induces less drag and increases the lift to drag ratio. Accordingly, these features may reduce the torque exerted on each of the blades so that they may be formed from relatively less strong and relatively less expensive materials.

In some embodiments, blade erosion also may be controlled, reduced, or eliminated by combining any of the above-described characteristics with one or more methods of blade cooling. Any method of turbine blade cooling could be combined with the present disclosure, including transpiration blade cooling, as more fully described below. In this regard, transpiration cooling may be employed to cool any of the various components of the turbine, combustor, and related apparatuses disclosed herein. With particular regard to the turbine, the case, stators (e.g., stator blades), seals, blades (e.g., turbine blades), rotor, and various other internal components may be transpiration cooled through, for example, employing the porous materials disclosed herein. In this regard, the stators may comprise the porous sintered material and the porous sintered material may be configured to direct the transpiration fluid to an exterior surface of the stators. Additionally, one or more of the components of the turbine assembly may be configured to direct transpiration fluid to the seals. The seals may comprise the porous sintered material in some embodiments. Example embodiments of seals and stators that may be transpiration cooled in accordance with embodiments of the disclosure are described in U.S. Pat. App. Pub. 2009/0142187, which is incorporated herein by reference in its entirety. However, various other embodiments of components of turbines, combustors, and related apparatuses may also be transpiration cooled in accordance with the present disclosure.

Further, the transpiration cooling techniques disclosed herein may provide improved cooling relative to existing transpiration cooling techniques. Current blade cooling is typically conducted with bleed air from the compressor of the turbine. This air has a limited heat capacity due to its relatively low density (e.g., 0.5-5 $kg/m^3$) set by the relatively low operating pressure of the turbine hot section in existing turbines, as described above. This limits the heat transfer rates. In contrast, as discussed below, the present disclosure provides for transpiration cooling through use of $CO_2$, which may provide improved heat transfer.

The heat transfer rates for existing embodiments of turbines are also limited by the relatively large stress placed on the turbine blades due to the long length of the blades resulting in high centrifugal forces during rotation thereof. The cooling passages in existing turbines thus must be kept relatively small and they must not define more than a relatively small fraction of the blade overall cross-sectional area in order to limit the reduction in longitudinal strength of the blades caused by the cooling passages.

The inventive turbines are particularly useful in systems and methods for power production in that the turbines not only provide for reduced blade erosion but also can significantly reduce total turbine cost. In specific embodiments, total turbine cost in relation to turbines used in typical power production systems can be reduced by at least 20%, at least 30%, at least 40%, at least 50%, at least 60%, at least 70%, or at least 75% without any significant loss in electrical power output (i.e., loss of less than 5%, less than 4%, less than 3%, less than 2%, less than 1%, or less than 0.8%). Reductions in cost may occur by avoiding the need for superalloys and/or other expensive materials in the blades due, for example, to a reduction in the centrifugal forces applied thereto. Further, reductions in power output may be minimized despite reduced rotating speeds by employing high inlet temperatures in the turbine as well as high operating pressures relative to existing embodiments of turbines.

In specific embodiments, the present disclosure can comprise systems and methods for power production that can incorporate the present turbine blade designs and modes of operation. For example, the inventive systems and methods allow for power production through use of a high efficiency fuel combustor (such as a transpiration cooled combustor), optionally with an associated circulating fluid (such as a $CO_2$ circulating fluid). Specifically, the use of a high pressure circulating fluid (or working fluid) that has a high $CO_2$ recycle ratio provides the ability to direct a portion of the $CO_2$ circulating fluid to the turbine blades for transpiration cooling.

The combination of transpiration cooling with the blade designs and modes of operation of the present disclosure particularly can be useful since erosion can be a function of turbine blade temperature and blade material composition. The combination of turbine blade design and operation with blade operation temperature can provide for a wide range of possible blade operation velocities and blade operation temperatures wherein blade erosion can be controlled, reduced, or eliminated. At lower blade temperatures, erosion is lower, and the blade velocity at which erosion starts can be higher. The ability to choose operation conditions is beneficial in that it can allow for the use of metal alloys that can resist erosion at higher blade velocities but otherwise would not be available for use at higher operating temperatures. In this regard, at lower temperatures, high strength steels are relatively immune to impact damages. As an example, rolled homogenous armor used on military vehicles is not damaged by solid steel bullets traveling at up to speeds of 400 mph (179 m/s).

In other embodiments, however, as more fully described below, transpiration may effect blade protection by preventing solidification of combustion product stream components (e.g., liquid ash). In such embodiments, transpiration cooling may be defined as cooling the blades (and/or other components) to a temperature below the temperature of the combustion product stream. More particularly, such cooling may be configured to have a lower limit that is greater than the temperature at which a component of the combustion product stream (e.g., liquid ash) will freeze (or solidify) and thus become deposited upon the turbine blades. For example, ash softening may begin at 590° C., and melting may occur at 870° C. Without transpiration cooling, the turbine would need to operate well below 590° C. to avoid ash buildup on the blades, which is too low for efficient operation. With transpiration protection, the turbine can operate above 870° C., where the ash is liquid, but the liquid droplets do not touch or stick to the surface because of the transpiration vapor layer covering substantially all surfaces that are internal to the turbine and thus subject to contact with components of a stream flowing through the turbine (e.g., the internal surface of the turbine housing, the external surfaces of the turbine blades within the turbine, etc.). Thus, transpiration protection may reduce or eliminate not only degradation due to mechanical erosion by particle impingement, but also chemical degradation by keeping the blades cooler, and by replacing air or air/steam as the coolant with $CO_2$ as the coolant in the form of a transpiration fluid.

In some embodiments, it can be useful for the turbines to be operated at blade velocities that are relative to the velocity of the combustion product flow. In such embodiments, it can be particularly beneficial for flow velocity to be significantly less than flow velocities in typical combustion processes. For example, flow velocity according to the disclosure can be less than about 400 mph (179 m/s), less than about 350 mph (156 m/s), less than about 300 mph (134 m/s), less than about 250 mph (112 m/s), less than about 200 mph (89 m/s), less than about 150 mph (67 m/s), or less than about 100 mph (45 m/s). The ratio of blade tip velocity to flow velocity preferably is greater than 1, greater than 1.5, greater than 2, greater than 2.5, or greater than 3. Specifically, the ratio of blade tip velocity to flow velocity can be about 1 to about 5, about 1.5 to about 4.75, about 1.75 to about 4.5, about 2 to about 4.25, or about 2.5 to about 4.

As a result of erosion, turbines may experience degradation in performance over time (e.g., through reduced efficiency and/or power output). For example, a conventional turbine may experience operational degradation of 10% power loss over a two to three year period. An overhaul to repair the turbine may cost approximately 50% of the purchase cost of the turbine. Accordingly, over a 20 year lifetime, existing turbines may be overhauled a total of eight times, which may cost a total of 4 times the initial purchase price of the turbine.

This degradation may be due to erosion caused by residual dust particles that get past an air filtration system positioned between the combustor and the turbine. Increasing the particulate removal effectiveness of the filters may not be a viable option because this may restrict air flow and reduce efficiency of the turbine. Thus, the turbines of the present disclosure may provide significant cost savings by minimizing or eliminating the need for overhauls by minimizing or eliminating damage from erosion. In this regard, the rate of dissipation of impact energy associated with collision between the particles and blades is approximately proportional to the cube of the relative velocity therebetween. In this regard, erosion of turbine blades tends to be approximately proportional to the rate of impact energy dissipation ("Impact Power"), as illustrated below:

$$IP = kV^3/X \qquad \text{(Formula 3)}$$

where:
IP=impact power,
k=a variable factor based on the particle material, the blade material, the ambient temperature, and the impact angle,
v=relative velocity between the turbine blades and particles, and
X=characteristic length of the impact interaction.

By reducing the speed of the blades and providing transpiration protection, impacts may be minimized or reduced below a threshold at which erosion occurs and chemical damage may also be reduced or eliminated. Accordingly, expenses associated with overhauls due to erosion may be reduced or eliminated, and thus embodiments of the turbines provided herein may provide significant cost savings. Further, as noted above, by eliminating the need for use of expensive superalloys, the turbines in accordance with the present disclosure may be relatively less expensive than existing turbines.

In various known embodiments of power plants, efficiency is critically dependent on turbine inlet temperatures. For example, extensive work has been done at great cost to achieve turbine technology allowing for inlet temperatures as high as about 1,350° C. The higher the turbine inlet temperature, the higher the plant efficiency, but also the more expensive the turbine is, and potentially, the shorter its lifetime. Because of the relatively high temperature of the combustion product stream, it can be beneficial for the turbine to be formed of materials capable of withstanding such temperatures. It also may be useful for the turbine to comprise a material that provides good chemical resistance to the type of secondary materials that may be present in the combustion product stream.

In certain embodiments, the present disclosure can particularly provide for the use of a cooling fluid with the turbine components. As more fully described below, for example, the inventive systems and methods allow for power production through use of a high efficiency fuel combustor (e.g., a transpiration cooled combustor) and an associated circulating fluid (such as a $CO_2$ circulating fluid). Specifically, a portion of the circulating fluid can be directed to the turbine components, particularly the turbine blades, to be used in turbine cooling, such as through transpiration cooling.

For example, in some embodiments, a portion of a $CO_2$ circulating fluid can be withdrawn from the cycle (e.g., from a portion of the cycle where the circulating fluid is under conditions useful for a transpiration cooling fluid) and directed to a turbine for cooling of the components, particularly the turbine blades. The blade cooling fluid can be discharged from holes (or perforations) in the turbine blade and be input directly into the turbine flow. Thus, rather than using air as a transpiration cooling fluid (which is limited in its cooling ability as described above, and hampered by safety concerns), the methods and systems of the disclosure provide for the use of very large quantities of high pressure $CO_2$, supercritical $CO_2$, and even liquid $CO_2$ as a turbine blade cooling medium. This is highly useful because it increases the cooling capacity available for the turbine blades by large ratios in relation to known blade cooling methods. The disclosure also is particularly useful because the $CO_2$ circulating fluid can be present in the system in very large quantities, which allows for a very large quantity of cooling fluid to be moved through the turbine blades. This high volume and/or high mass flow of $CO_2$ cooling fluid through the turbine blades not only protects the turbine blades from the extreme heat that is useful for high efficiency power production methods, but it also assists in protecting the turbine blades from the corrosive and erosive effects of the high temperature gases and unfiltered particulate material flowing through the turbine by transpiration of the $CO_2$ cooling fluid out through the entire surface of the blade. In one embodiment transpiration cooling may provide for operational blade temperatures from about 200° C. to about 700° C. despite the significantly higher turbine inlet temperatures described above (e.g., 1350° C.), which may thus allow for use of turbine blades comprising relatively less expensive materials than those which are presently employed and/or higher turbine inlet temperatures may be employed, which may lead to greater efficiency. The foregoing transpiration cooled turbine components can be used in any power production method and system wherein high pressure $CO_2$ (or other fluid which is less corrosive than air or steam, such as $N_2$) can be made available as a high recycle ratio circulating fluid.

In specific embodiments, the use of a $CO_2$ circulating fluid as a turbine blade cooling medium allows for the turbine blades to be fabricated from much lower cost materials than known turbine blades used in high efficiency power production methods because use of the $CO_2$ cooling medium prevents the blades in the present disclosure from being heated to the extreme temperatures of the surrounding combustion product flow and reduces the corrosive and erosive effects of the combustion product flow. For example, according to the present disclosure, turbine blades could be fabricated from a wide variety of high strength steels, or even relatively low cost steels. Likewise, the blades could be fabricated from carbon composites or even low temperature materials, such as aluminum. Any material recognized as useful in the art for gas turbine components, even for turbines used in low temperature conditions and/or low erosive or low corrosive conditions, could be used for fabricating turbine components according to the present disclosure.

Transpiration cooling of turbine blades with a portion of a $CO_2$ circulating fluid according to the present disclosure further is useful because it can facilitate the safe passage of combustion gasses containing ash (or other particulate matter and/or incombustibles) through the turbine without the need for an intervening filtration step and component. This can greatly simplify the design of power production facilities and increase the types of materials that may be used as the fuel source for combustion.

The use of a $CO_2$ circulating fluid in transpiration cooling of turbine components according to the present disclosure also is advantageous in relation to the thermodynamics of the power production cycle. Because of the vastly improved cooling ability of the $CO_2$ circulating fluid in relation to known transpiration media for turbine blades, it is possible to operate the combustor at increased temperatures without the limitation of the heat tolerance of the turbine. Thus, combustors capable of operation at extremely high temperatures (e.g., transpiration cooled combustors) can be operated according to the present disclosure at near maximum operating temperatures since the combustion product flow can be passed through the $CO_2$ cooled turbine without damage to the turbine components. This increases the potential thermodynamic efficiency of the power production cycle to approaching 100%.

Any combination of turbine blade design, overall turbine design, and transpiration cooling of the turbine blades can be used in any power production method where turbine blade life is desirably extended, such as methods and systems where combustion results in formation of particulates. In some embodiments, the methods and systems particularly can be those wherein a circulating fluid can be used. For example, high pressure $CO_2$ can be made available as a high recycle ratio circulating fluid.

For example, a turbine as described herein may be used in a method and system wherein a $CO_2$ circulating fluid is provided in a combustor along with an appropriate fuel, any necessary oxidant, and any associated materials that may be useful for efficient combustion. Such systems and methods can comprise a combustor that operates at very high temperatures (e.g., in the range of about 1,600° C. to about 3,300° C., or even greater), and the presence of the circulating fluid can function to moderate the temperature of a fluid stream exiting the combustor so that the fluid stream can be utilized in energy transfer for power production. Specifically, a combustion product stream can be expanded across at least one turbine to generate power. The expanded gas stream can be cooled to remove various components from the stream, such as water, and heat withdrawn from the expanded gas stream can be used to heat the $CO_2$ circulating fluid. The purified circulating fluid stream can then be pressurized and heated for recycle through the combustor. Exemplary power production systems and methods that may incorporate the turbine blade designs of the present disclosure (with or without associated blade transpiration cooling) are described in U.S. Pat. App. Pub. 2011/0179799, which is incorporated herein by reference in its entirety.

The incorporation of a turbine according to the disclosure in a combustion power cycle is particularly useful in relation to combustion of fuels that result in a particulate component. Various types of coal, for example, can be combusted in a power production cycle to produce a combustion stream having a content of ash and/or other particulates. Beneficially, when a turbine according to the disclosure is incorporated into the combustion cycle, the full combustion product stream (i.e., including the full content of particulates) can be introduced into the turbine without the need of a preliminary filtering step. This enables the use of higher turbine inlet temperature which in turn increases combustion efficiency in relation to processes requiring filtration of the combustion product prior to passage through the turbine. This is possible according to the disclosure since the inventive turbines can be subjected to particle impingement without significant erosion. Particulate materials then can be filtered from the stream exiting the turbine.

One embodiment of a combustion cycle provided according to the present disclosure is illustrated in the flow diagram of FIG. 1. In the illustrated embodiment, an air separation unit 100 is provided to intake ambient air 10 and output an enriched oxygen stream 120. The oxygen stream 120 may comprise oxygen having a molar purity of at least about 50%, at least about 60%, at least about 70%, at least about 80%, at least about 85%, at least about 90%, or at least about 95%. The oxygen stream 120 may be supplied, for example, by any air separation system/technique known in the art, such as, for example, a cryogenic air separation process, or a high temperature ion transport membrane oxygen separation process (from air), could be implemented. In specific embodiments, an enriched oxygen stream may be produced by the operation of a cryogenic air separation process in which the oxygen is pressurized in the process by pumping liquid oxygen that is efficiently heated to ambient temperature conserving refrigeration. Such a cryogenic pumped oxygen plant can have two air compressors, both of which can be operated adiabatically with no inter-stage cooling. In specific embodiments, it may be useful to include components useful for recovering heat produced by the air separation unit and transferring the heat to a component of the presently described system where heat input may be desirable.

The cycle illustrated in FIG. 1 can be useful for combustion of any fuel source that includes particulate matter (e.g., ash) as a component of the combustion product. Non-limiting examples of fuels that are useful according to the disclosure include various grades and types of coal, wood, oil, tar from tar sands, bitumen, biomass, algae, graded combustible solid waste refuse, asphalt, and used tires. In particular, any solid fuel material may be used in the disclosure, and such fuels particularly may be ground, shredded, or otherwise processed to reduce particles sizes, as appropriate. A fluidization or slurrying medium can be added, as necessary, to achieve a suitable form and to meet flow requirements for high pressure pumping. For example, referring to FIG. 1, the solid fuel 15 can be passed through a mill apparatus 200 to provide a powdered fuel. In other embodiments, the solid fuel 15 could be provided in a particularized condition to forego the need for on-site milling. In specific embodiments, the solid fuel 15 may have an average particle size of about 10 $\mu$m to about 500 $\mu$m, about 25 $\mu$m to about 400 $\mu$m, or about 50 $\mu$m to about 200 $\mu$m. In other embodiments, the solid fuel 15 may be described in that greater than 50%, 60%, 70%, 80%, 90%, 95%, or 99% of the solid fuel particles have an average size of less than about 500 $\mu$m, 400 $\mu$m, 300 $\mu$m, 200 $\mu$m, or 100 $\mu$m.

The solid fuel 15 can be suitably processed to allow for injection into a combustion apparatus at sufficient rates and at pressures above the pressure within the combustion chamber. To provide such characteristic, the solid fuel 15 may be in liquid, slurry, gel, or paste form with appropriate fluidity and viscosity at ambient temperatures or at elevated temperatures. For example, the solid fuel 15 may be provided at a temperature of about 30° C. to about 500° C., about 40° C. to about 450° C., about 50° C. to about 425° C., or about 75° C. to about 400° C. When the solid fuel 15 is in a ground, shredded, or otherwise processed condition so that particle size is appropriately reduced, a fluidization or slurrying medium can be added, as necessary, to achieve a suitable form and to meet flow requirements for high pressure pumping. As illustrated in the embodiment of FIG. 1, the particulate solid fuel 220 produced from the solid fuel 15 by the mill apparatus 200 can be mixed with a fluidizing substance to provide the coal in the form of a slurry. In particular, the particulate solid fuel 220 is combined in a mixer 250 with a $CO_2$ side draw 562 from a recycled $CO_2$ circulating fluid stream 561. The $CO_2$ side draw 562 may be provided in a supercritical, high density state. In specific embodiments, the $CO_2$ used to form the slurry can have a density of about 450 kg/m$^3$ to about 1,100 kg/m$^3$. More particularly, the $CO_2$ side draw 562 may cooperate with the particulate solid fuel 220 to form a slurry 255 having, for example, from about 10 weight % to about 75 weight % or from about 25 weight % to about 55 weight % of the particulate coal. Moreover, the $CO_2$ from the side draw 562 used to form the slurry 255 may be at a temperature of less than about 0° C., less than about –10° C., less than about –20° C., or less than about –30° C. In further embodiments, the $CO_2$ from the side draw 562 used to form the slurry may be at a temperature of about 0° C. to about –60° C., about –10° C. to about –50° C., or about –18° C. to about –40° C. Although the slurrying step is described in terms of using $CO_2$ as a slurry medium, it is understood that other slurrying mediums could be used.

The slurry 255 can be transferred from the mixer 250 via a pump 270 to a combustion apparatus 300. In specific embodiments, the combustion apparatus 300 can be a high efficiency combustor capable of providing substantially complete combustion of a fuel at a relatively high combustion temperature. High temperature combustion can be particularly useful to provide for substantially complete combustion of all combustible components of the fuel and thus maximize efficiency. In various embodiments, high temperature combustion can mean combustion at a temperature of at least about 1,000° C., at least about 1,200° C., at least about 1,500° C., at least about 2,000° C., or at least about 3,000° C. In further embodiments, high temperature combustion can mean combustion at a temperature of about 1,000° C. to about 5,000° C. or, about 1,200° C. to about 3,000° C.

In certain embodiments, the combustion apparatus 300 may be a transpiration cooled combustor. One example of a transpiration cooled combustor that may be used in the disclosure is described in U.S. Pat. App. Pub. No. 2010/0300063 and U.S. Pat. App. Pub. No. 2011/0083435, the disclosures of which are incorporated herein by reference in their entirety. In some embodiments, a transpiration cooled combustor useful according to the disclosure may include one or more heat exchange zones, one or more cooling fluids, and one or more transpiration fluids.

The use of a transpiration cooled combustor according to the present disclosure is particularly advantageous over the known art around fuel combustion for power production. For example, the use of transpiration cooling can be useful to prevent corrosion, fouling, and erosion in the combustor. This further allows the combustor to work in a sufficiently high temperature range to afford complete or at least substantially complete combustion of the fuel that is used. These, and further advantages, are further described herein.

In one particular aspect, a transpiration cooled combustor useful according to the disclosure can include a combustion chamber at least partially defined by a transpiration member, wherein the transpiration member is at least partially surrounded by a pressure containment member. The combustion chamber can have an inlet portion and an opposing outlet portion. The inlet portion of the combustion chamber can be configured to receive the carbon containing fuel to be combusted within the combustion chamber at a combustion temperature to form a combustion product. The combustion chamber can be further configured to direct the combustion product toward the outlet portion. The transpiration member can be configured to direct a transpiration substance therethrough toward the combustion chamber for buffering interaction between the combustion product and the transpiration member. In addition, the transpiration substance may be introduced into the combustion chamber to achieve a desired outlet temperature of the combustion product. In particular embodiments, the transpiration substance can at least partially comprise the circulating fluid. The walls of the combustion chamber may be lined with a layer of porous material through which the transpiration substance, such as $CO_2$ and/or $H_2O$, is directed and flows.

The flow of the transpiration substance through this porous transpiration layer, and optionally through additional provisions, can be configured to achieve a desired total exit fluid stream outlet temperature from the combustion apparatus 300. In some embodiments, as further described herein, such temperature can be in the range of about 500° C. to about 2,000° C. This flow may also serve to cool the transpiration member to a temperature below the maximum allowable operational temperature of the material forming the transpiration member. The transpiration substance may also serve to prevent impingement of any liquid or solid ash materials or other contaminants in the fuel which might corrode, foul, or otherwise damage the walls. In such instances, it may be desirable to use a material for the transpiration member with a reasonable thermal conductivity so that incident radiant heat can be conducted radially outwards through the porous transpiration member and then be intercepted by convective heat transfer from the surfaces of the porous layer structure to the fluid passing radially inwards through the transpiration layer. Such a configuration may allow the subsequent part of the stream directed through the transpiration member to be heated to a temperature in a desirable range, such as about 500° C. to about 1,000° C. or from about 200° C. to about 700° C., while simultaneously maintaining the temperature of the porous transpiration member within the design range of the material used therefor. Suitable materials for the porous transpiration member may include, for example, porous ceramics, refractory metal fiber mats, hole-drilled cylindrical sections, and/or sintered metal layers or sintered metal powders. A second function of the transpiration member may be to ensure a substantially even radially inward flow of transpiration fluid, as well as longitudinally along the combustor, to achieve good mixing between the transpiration fluid stream and the combustion product while promoting an even axial flow of along the length of the combustion chamber. A third function of the transpiration member can be to achieve a velocity of diluent fluid radially inward so as to provide a buffer for or otherwise intercept solid and/or liquid particles of ash or other contaminants within the combustion products from impacting the surface of the transpiration layer and causing blockage, erosion, corrosion, or other damage. Such a factor may only be of importance, for example, when combusting a fuel, such as coal, having a residual inert non-combustible residue. The inner wall of the combustor pressure vessel surrounding the transpiration member may also be insulated to isolate the high temperature transpiration fluid stream within the combustor.

In certain embodiments, a mixing arrangement (not illustrated) may be provided to combine the materials to be introduced into the combustion apparatus 300 prior to such introduction. Specifically, any combination of two or all three of the fuel, $O_2$, and circulating fluid (e.g., $CO_2$ circulating fluid) may be combined in the optional mixing arrangement prior to introduction into the combustion apparatus 300.

The fuel 15 introduced to the combustion apparatus 300 (as the slurry stream 255) along with the $O_2$ 120 and a recycled circulating fluid 503 is combusted to provide a combustion product stream 320. In specific embodiments, the combustion apparatus 300 is a transpiration cooled combustor, such as described above. Combustion temperature can vary depending upon the specific process parameters—e.g., the type of fuel used, the molar ratio of circulating fluid to carbon in the fuel as introduced into the combustor, and/or the molar ratio of $CO_2$ to $O_2$ introduced into the combustor. In specific embodiments, the combustion temperature is a temperature as described above in relation to the description of the transpiration cooled combustor. In particularly preferred embodiments, combustion temperatures in excess of about 1,000° C., as described herein, may be advantageous.

It also can be useful to control combustion temperature such that the combustion product stream leaving the combustor has a desired temperature. For example, it can be useful for the combustion product stream exiting the combustor to have a temperature of at least about 700° C., at least about 900° C., at least about 1,200° C., or at least about 1,600° C. In some embodiments, the combustion product stream may have a temperature of about 700° C. to about 1,600° C. or about 1,000° C. to about 1,500° C.

Specifically, the pressure of the combustion product stream 320 can be related to the pressure of the circulating fluid that is introduced into the combustion apparatus 300. In specific embodiments the pressure of the combustion product stream 320 can be at least about 90% of the pressure of the circulating fluid introduced into the combustion apparatus 300.

The chemical makeup of the combustion product stream 320 exiting the combustion apparatus 300 can vary depending upon the type of fuel used. Importantly, the combustion product stream will comprise the major component of the circulating fluid (e.g., $CO_2$) that will be recycled and reintroduced into the combustion apparatus 300 or further cycles. In further embodiments, the combustion product stream 320 may comprise one or more of water vapor, $SO_2$, $SO_3$, HCl, NO, $NO_2$, Hg, excess $O_2$, $N_2$, Ar, incombustibles and/or other particulate matter, and possibly other contaminants that may be present in the fuel that is combusted. These materials present in the combustion product stream may persist in the $CO_2$ circulating fluid stream unless removed, such as by processes described herein.

Advantageously, according to the present disclosure, the combustion product stream 320 can be directed to a turbine 400 without the necessity of first filtering out any particulate material in the combustion product stream 320. In the turbine 400, the combustion product stream 320 is expanded to generate power (e.g., via a generator 400a to produce electricity). The turbine 400 can have an inlet for receiving the combustion product stream 320 and an outlet for release of a turbine discharge stream 410. Although a single turbine 400 is shown in FIG. 1, it is understood that more than one turbine may be used, the multiple turbines being connected in series or optionally separated by one or more further components, such as a further combustion component, a compressing component, a separator component, or the like.

The turbine 400 specifically can be a turbine having a blade design and/or overall design as otherwise described herein. Further, the turbine may incorporate transpiration cooling or other cooling technology, as described herein. In particular, the turbine design can be one with such low blade velocity and ash particle impingement velocity such as to enable the turbine to endure impingement without significant erosion. Transpiration cooling of the turbine further can protect against particle erosion by creating a continuous flow barrier layer of the transpiration fluid between the blade surface and the particulate material passing through the turbine.

Returning to FIG. 1, the exemplary system and cycle further comprises a filter 5 downstream from the turbine 400. The turbine discharge stream 410 can be passed through the filter 5 to remove the particulate materials therefrom. The placement of the filter 5 downstream of the turbine 400, instead of upstream of the turbine, is an advantageous characteristic of the disclosure since the combustion product stream 320 can be expanded across the turbine at the higher temperature and pressure when immediately exiting the combustor apparatus 300 and thus power production may be maximized. The lower pressure and cooler turbine discharge stream 410 can then be filtered in the filter 5 to remove the particulate materials therefrom as particulate stream 7. The filtered turbine discharge stream 420 thus is provided substantially free from particulate material for further processing in the combustion cycle.

In specific embodiments, the filter 5 preferably can comprise a configuration that is effective for removing substantially all of the particulate material present in the combustion product stream 320. The filter 5 may comprise a cyclone filter and/or a candle filter in some embodiments, and filtration may occur from about 300° C. to about 775° C. in some embodiments. In particular embodiments, removal of substantially all of the particulates can encompass removal of at least 95%, at least 96%, at least 97%, at least 98%, at least 99%, at least 99.5%, or at least 99.8% by volume of the particulates present in the combustion product stream. Such particulate removal efficiency of the filter can be related to particle size. For example, the noted percentage of particles removed can relate to the ability of the filter to retain particles having a diameter of at least about 0.1 μm, at least about 0.5 μm, at least about 1 μm, at least about 5 μm, at least about 10 μm, at least about 25 μm, at least about 50 μm, at least about 100 μm, or at least about 500 μm. In one embodiment the particles produced by combustion may be in the range from about 0.1 μm to about 100 μm, and the filter may be configured to remove substantially all particles above about 1 μm, above about 5 μm, above about 10 μm, above about 15 μm, or above about 20 μm and reduce the total particulate levels to less than about 10 mg/m³, less than about 5 mg/m³, less than about 1 mg/m³, or less than about 0.5 mg/m³.

In particular embodiments (i.e., wherein $CO_2$ is used as a circulating fluid), the filtered turbine discharge stream 420 can be passed through a heat exchanger unit 500 (which may be a series of heat exchangers) to form an unprocessed recycle stream 501. This unprocessed recycle stream 501 can be passed through a cold water heat exchanger 520 to form stream 521, which is passed to a separator 540 for removal of secondary components (e.g., $H_2O$, $SO_2$, $SO_4$, $NO_2$, $NO_3$, and Hg) as a stream 542. In specific embodiments, the separator 540 can comprise a reactor that provides a contactor with sufficient residence time such that the impurities can react with water to form materials (e.g., acids) that are easily removed. A purified circulating fluid stream 541 from the separator 540 can be passed through a compressor 550 to form stream 551, which can be further cooled with a cold water heat exchanger 560 to provide a supercritical, high density $CO_2$ circulating fluid 561. In certain embodiments, the purified $CO_2$ circulating fluid 541 can be compressed to a pressure of at least about 7.5 MPa or at least about 8 MPa. A portion of stream 561 can be withdrawn as stream 562 for use as the fluidizing medium in the mixer 250 to form the slurry stream 255. The supercritical, high density $CO_2$ circulating fluid stream 561 otherwise is further pressurized in compressor 570 to form the pressurized, supercritical, high density $CO_2$ circulating fluid stream 571. A portion of the $CO_2$ in stream 571 may be withdrawn as stream 572 to a $CO_2$ pipeline or other means of sequestration. The remaining portion of the $CO_2$ can proceed as pressurized, supercritical, high density $CO_2$ circulating fluid stream 573, which can be passed back through the heat exchanger 500 (or series of heat exchangers) to heat the stream. In specific embodiments, the $CO_2$ circulating fluid can be provided at a density of at least about 200 kg/m³, at least about 300 kg/m³, at least about 500 kg/m³, at least about 750 kg/m³, or at least about 1,000 kg/m³ after discharge from the cold water heat exchanger 560 (and prior to passage through the heat exchanger unit 500 for heating). In further embodiments, the density may be about 150 kg/m³ to about 1,100 kg/m³. Passage of the stream 551 through the cold water heat exchanger 560 can cool the $CO_2$ circulating fluid to a temperature of less than about 60° C., less than about 50° C., or less than about 30° C. The $CO_2$ circulating fluid in stream 561 entering the second compressor 570 can be provided at a pressure of at least about 12 MPa. In some embodiments, the stream can be pressurized to a pressure of about 15 MPa to about 50 MPa. Any type of compressor capable of working under the noted temperatures and capable of achieving the described pressures can be used, such as a high pressure multi-stage pump.

The heated, pressurized, supercritical, high density $CO_2$ circulating fluid can exit the heat exchanger 500 as first stream 503 to be provided as the recycled circulating fluid. In some embodiments, the heated, pressurized, supercritical, high density $CO_2$ circulating fluid can exit the heat exchanger 500 as a second recycled circulating fluid stream 504 to be provided as a transpiration fluid for the turbine blades. Preferably, the second recycled circulating fluid stream 504 can be controllable such that the total mass or volume of circulating fluid in the stream can be increased or decreased as demand requires increasing or decreasing the protection provided by the transpiration fluid. Specifically, a system according to the disclosure can include flow control means such that the second recycled circulating fluid stream 504 can be completely stopped when desired. Note that in some embodiments the recycled circulating fluid (e.g., $CO_2$) provided to the turbine 400 may bypass the heat exchanger 500 prior to being provided to the turbine. In this regard, the recycled $CO_2$ may be compressed by the compressor 570 and then a portion of circulating fluid stream 571 may bypass the heat exchanger 500 and enter the turbine 400. Thereby $CO_2$ (or other recycled circulating fluid) may be introduced into the turbine 400 without being warmed by the heat exchanger 500. Accordingly, the $CO_2$ (or other recycled circulating fluid) may be introduced into the turbine at a temperature that is less than the temperature of fluid warmed by the heat exchanger. In this regard, the $CO_2$ (or other recycled circulating fluid) may be introduced into the turbine at a temperature of less than about 300° C., less than about 200° C., less than about 100° C., less than about 55° C., or less than about 25° C. and thus, the $CO_2$ (or other recycled circulating fluid) may be employed to cool the turbine 400. In order to compensate for adding relatively cooler circulating fluid to the turbine 400, $O_2$ may travel through the heat exchanger 500 to warm the $O_2$ and then the $O_2$ may be combined with the recycled circulating fluid 503 directed to the combustor 300 to compensate for the loss in efficiency that may otherwise occur. In certain embodiments, circulating fluid leaving the cold end of the heat exchanger (or the final heat exchanger in the series when two or more heat exchangers are used) can have a temperature of less than about 200° C., less than about 100° C., less than about 75° C., or less than about 40° C.

In certain embodiments, it may thus be useful for the heat exchanger receiving the turbine discharge stream to be formed from high performance materials designed to withstand extreme conditions. For example, the heat exchanger may comprise an INCONEL® alloy or similar material. Preferably, the heat exchanger comprises a material capable of withstanding a consistent working temperature of at least about 700° C., at least about 900° C., or at least about 1,200° C. It also may be useful for one or more of the heat exchangers to comprise a material that provides good chemical resistance to the type of secondary materials that may be present in the combustion product stream. INCONEL® alloys are available from Special Metals Corporation, and some embodiments can include austenitic nickel-chromium-based alloys. Suitable heat exchangers can include those available under the tradename HEATRIC® (available from Meggitt USA, Houston, TX).

As noted above, in addition to water, the $CO_2$ circulating fluid may contain other secondary components, such as fuel-derived, combustion-derived, and oxygen-derived impurities. These secondary components of the $CO_2$ circulating fluid (often recognized as impurities or contaminants) can all be removed from the cooled $CO_2$ circulating fluid using appropriate methods (e.g., methods defined in U.S. Patent Application Publication No. 2008/0226515 and European Patent Application Nos. EP1952874 and EP1953486, which are incorporated herein by reference in their entirety). For example, $SO_2$ and $SO_3$ can be converted 100% to sulfuric acid, while >95% of the NO and $NO_2$ can be converted to nitric acid. Any excess $O_2$ present in the $CO_2$ circulating fluid can be separated as an enriched stream for optional recycle to the combustor. Any inert gases present (e.g., $N_2$ and Ar) can be vented at low pressure to the atmosphere.

As described above, a power production cycle incorporating a turbine that is configured according to the disclosure can operate at a high efficiency in part because the combustion product stream (e.g., arising from combustion of a solid fuel, such as coal) can be inputted directly into the turbine without the need for first filtering out particulate material present in the combustion product stream. Particularly, the inventive turbine configurations eliminate or greatly reduce blade erosion arising from impingement of the non-combusted material. Even though the disclosure provides such valuable protection of the turbine materials, there still may be occasion for turbine impairment arising from interaction of the turbine components with the particulate components of the combustion product stream.

For example, liquid ash sticking and freezing (or solidifying) onto the turbine blades can cause slagging, loss of efficiency, and/or loss of rotor balance. Accordingly, in certain embodiments, the present disclosure provides for incorporation of specific components into a combustion cycle for alleviating and/or at least partially removing buildup or chemical deposits from turbine components, particularly turbine blades. Although ash buildup is exemplified herein, it is understood that the cleaning provided by embodiments of the present disclosure would be expected to be effective in at least partially removing or completely removing any type of deposit on the turbine components arising from materials present in the combustion product stream, particularly particulate materials. Thus, various types of ash, ash derived material, and carbon may be removed by the cleaning provided herein.

Buildup of chemical deposits on turbine components, such as turbine blades, may be prevented by employing transpiration protection techniques. For example, as seen in FIG. 1, hot recycled working fluid (e.g., $CO_2$) can be withdrawn from the hot end of the heat exchanger 500 as stream 504 and delivered to the turbine 400. For example, the hot recycled working fluid can be delivered to the turbine rotor and then through the turbine blades to provide transpiration protection of the turbine blades. In such embodiments, the turbine blades can be perforated as necessary so that a hot recycled working fluid exits the blades along substantially the entire surface of the blades, or at least the leading surface of the blades that is in the direct path of the combustion product stream entering the turbine. In specific embodiments, the greatest flow of transpiration fluid out of the blades would be at the leading edges of the blades.

The transpiration fluid may be provided at various temperatures. In some embodiments, the transpiration fluid for the turbine may be at a temperature that is within about 10%, within about 8%, within about 5%, or within about 2% of the temperature of the combustion product stream entering the turbine. In such embodiments, the temperature of the transpiration fluid for the turbine may be characterized as being substantially similar to the temperature of the combustion product stream entering the turbine. In other embodiments, the transpiration fluid directed to the turbine for transpiration protection may be 15% to about 90% less than, about 15% to about 60% less than, about 15% to about 50% less than, or about 20% to about 40% less than the temperature of the combustion product stream entering the turbine. In such embodiments, the temperature of the transpiration fluid for the turbine may be characterized as being substantially less than the temperature of the combustion product stream entering the turbine.

In some embodiments, the use of the transpiration fluid with the turbine blades can perform multiple functions. For example, the transpiration fluid can be effective for protecting the turbine blades as it can essentially prevent particulate materials in the combustion product stream from actually contacting the blade surface. Rather, the protective barrier formed by the transpiration fluid can deflect or otherwise redirect the particulate materials around the turbine blades. The hot recycled working fluid also can function to heat the blades, particularly the blade surfaces on the outlet side of the turbine. This additional heating can prevent the blade surfaces, on the outlet side and/or the inlet side, from cooling to a temperature wherein liquid ash (or other materials that are liquid at the temperature of the combustion product stream and have a freezing (or solidification) point that is less than the temperature of the combustion product stream but greater than ambient temperature) will solidify (i.e., the freezing temperature of the material). This prevents the liquid particles that actually contact the surface of the turbine blade from freezing (or solidifying) and thus depositing on the blade surfaces.

Transpiration protection can eliminate particle freezing (or solidifying) in some embodiments. In this regard, all ash may remain molten above approximately 870° C.-980° C. in some embodiments. In other embodiments, particle freezing can be reduced in relation to identical cycles and systems that do not incorporate transpiration protection. To the extent particle freezing is reduced but not eliminated, periodic cleaning of the turbine components may be necessary. In specific embodiments, cleaning of turbine components, such as turbine blades, may be effected through incorporation of cleaning components into a combustion cycle or system.

The cycle shown in FIG. 2 illustrates a system wherein turbine blade cleaning materials can be directed through the turbine to effect cleaning of the turbine blades. Beneficially, the cleaning materials may be directed through the turbine in parallel with the combustion product stream. Thus, cleaning can be effected without interrupting the power production combustion cycle. In some embodiments, it may be desirable to alter one or more of the cycle parameters discussed herein to facilitate the cleaning process (e.g., to alter the temperature of the combustion product stream, to increase the ratio of recycle fluid to fuel, or the like). In embodiments wherein the turbine blade is being transpiration protected, it may be desirable to cease the transpiration fluid flow to facilitate contact of the cleaning material with the turbine blades. However, combustion and power generation may continue during the cleaning process.

Referring to FIG. 2, a combustion cycle can proceed substantially as described above in relation to FIG. 1. In the present embodiments, however, a third recycled circulating fluid stream 506 can exit the heat exchanger 500 and pass through a cleaning material junction 600 wherein the cleaning material is combined with the third recycled circulating fluid stream 506 to form the cleaning material stream 610. The cleaning material junction 600 can comprise any structure, unit, or device suitable for combining the third recycled circulating fluid stream 506 with the cleaning material wherein the cleaning material is provided in a continuous flow or is provided batchwise. Preferably, the cleaning material junction is configured such that the cleaning material is combined with and flows with the third recycled circulating fluid stream 506. As also described above in relation to the second recycled circulating fluid stream 504, the third recycled circulating fluid stream 506 can be controlled such that the flow rate can be zero or can be any rate necessary to effectively transfer the cleaning material to the turbine.

The cleaning material can be any material effective to contact the surface of the turbine blades and physically or chemically remove solid deposits therefrom. Preferably, the cleaning material comprises a material that is effective to remove the deposits with minimal to no erosion of the blade surfaces themselves. Solid cleaning materials may include carbon particles, alumina particles, or other hard particles configured to not melt at the flow temperatures. Erosion of ash but not the blades may occur at the low impact velocities because the ash may define a lower fracture strength than the blade. Liquid cleaning materials may include potassium compounds such as potassium oxide, carbonate, or hydroxide. The potassium compounds may act as a flux to lower the melting point of the ash so it may melt off the blades. Gaseous cleaning materials may include oxygen which may oxidize deposits such as carbon. Solid or liquid cleaning materials combined with the third recycled circulating fluid stream 506 at the cleaning material junction 600 may define less than about 0.5%, less than about 0.1%, or less than about 0.01% of the total mass flow rate of the cleaning material stream 610 and from about 0.001% to about 0.1%, from about 0.1% to about 1%, or from about 0.0001% to about 0.01% of the total mass flow rate of the cleaning material stream. Gaseous cleaning materials combined with the third recycled circulating fluid stream 506 at the cleaning material junction 600 may define less than about 5%, less than about 2%, or less than about 1% of the total mass flow rate of the cleaning material stream 610 and from about 0.1% to about 2%, from about 0.01% to about 1%, or from about 0.01% to about 5% of the total mass flow rate of the cleaning material stream. In one embodiment the cleaning cycle may be initiated whenever the power output by the generator 400a drops from about 2% to about 5%, from about 5% to about 10%, or from about 1% to about 2%. For example, the cleaning operation may be conducted from about once per week to about once every three years. The cleaning cycle may last from about five minutes to about one hour in some embodiments.

The cleaning material stream 610 may flow directly into the turbine 400. In such embodiments, the cleaning material stream may mix with the combustion product stream 320 in a common inlet to the turbine 400, or the cleaning material stream 610 and combustion product stream 320 may have individual inlets into the turbine such that the streams mix at a point interior to the turbine 400. In the illustrated embodiment, the cleaning material stream 610 is first mixed with the combustion product stream 320 in a flow combiner switch 650. Thus, in a cleaning cycle, the combined combustion product and cleaning material stream 326 exits the flow combiner switch 650 and enters the turbine 400.

In some embodiments, continuous cleaning may be used wherein some minimal flow of the third recycled circulating fluid stream 506 can be maintained such that an amount of cleaning material is continuously introduced into the turbine. The flow of the third recycled circulating fluid stream 506 could be adjusted up or down periodically to increase or reduce the cleaning capacity of the cycle. In other embodiments, the third recycled circulating fluid stream 506 can be closed so that no cleaning material passes from the cleaning material junction 600 into the flow combiner switch 650. In this mode of operation, the combustion product stream 320 may bypass the flow combiner switch 650 and pass directly into the turbine, as illustrated in FIG. 1. Alternately, the combustion product stream 320 may continue to flow through the combiner switch 650 but, in the absence of an incoming cleaning material stream 610, the stream exiting the combiner switch 650 would be essentially the combustion product stream 320 and not the combined combustion product and cleaning material stream 326.

In embodiments wherein the cleaning cycle is active, the deposits or residue removed from the turbine blades can be removed from the cycle via the filter 5 in the manner described in relation to FIG. 1. Likewise, when solid cleaning materials are used, the solid cleaning materials can be removed from the cycle via the filter 5. In some embodiments, the filter 5 may be a multi-unit filter wherein a first filter media or unit is used in the normal course of the combustion cycle, and a second filter media or unit can be used during the cleaning cycle to collect the cleaning material and the removed blade deposits without unnecessarily fouling the filter used in the normal combustion cycle. The inventive system could incorporate the appropriate devices to facilitate such switching between filters.

EXAMPLE EMBODIMENTS

The present disclosure will now be described with specific reference to the following examples, which are not intended to be limiting of the disclosure and are rather provided to show exemplary embodiments.

FIG. 3 illustrates an example embodiment of a combustor 1000 that may be employed in accordance with the systems and methods disclosed herein. The combustor 1000 may define a combustion chamber 1002 into which fuel and $O_2$ are directed through a fuel inlet 1004 and an $O_2$ inlet 1006. Accordingly, the fuel may be combusted to form a combustion product stream 1008. The combustor 1000 may comprise a casing comprising an outer casing 1010 and an inner casing 1012. The inner casing 1012 may comprise a transpiration material such as a porous sintered material (e.g., a porous sintered metal material) that is configured to receive a transpiration fluid 1014 and transpire the fluid therethrough to define a transpiration layer 1016 configured to reduce the heat incident on the casing. The transpiration fluid 1014 may be received in some embodiments through an inlet 1026, although the transpiration fluid may be received from a turbine attached to the combustor in some embodiments, as described below. Accordingly, the combustor 1000 may be configured to withstand the heat produced in the combustion chamber 1002 without employing expensive heat resistant materials such as superalloys and/or the combustor may operate at increased combustion temperatures.

As described above, the combustion product stream produced by a combustor may be employed to drive a turbine. In this regard, FIG. 4 illustrates an example embodiment of a turbine 2000. In one embodiment the turbine 2000 may include an inlet conduit 2002 configured to couple to an outlet of a combustor (e.g., combustor 1000) and direct a combustion product stream (e.g., combustion product stream 1008) to an inlet of a casing 2004 of the turbine. The turbine 2000 may comprise a rotor 2006 to which a plurality of blades 2008 are attached. The rotor 2006 may comprise an annular flow diverter 2010 configured to divert the combustion product stream around the rotor. Accordingly, the combustion product stream 1008 may be expanded while traveling through the turbine 2000, thereby causing the blades 2008 to rotate the rotor 2006 and a power shaft 2011 (which may be integral with the rotor, or coupled thereto) before a turbine discharge stream 2012 is discharged through one or more outlets 2014. Thus, the turbine 2000 may drive a generator, or other device.

As further illustrated in FIG. 4, the inlet conduit 2002 may comprise an inner casing 2016 and an outer casing 2018. Further, the casing 2004 of the turbine 2000 may comprise an inner casing 2020 and an outer casing 2022. A transpiration fluid 2024 may be directed from an inlet 2026 between the inner casings 2016, 2020 and the outer casings 2018, 2022 of the inlet conduit 2002 and the turbine 2000. The inner casings 2016, 2020 may comprise a transpiration material such as a porous sintered material (e.g., a porous sintered metal material) that is configured to receive the transpiration fluid 2024 and transpire the fluid therethrough. Thereby a transpiration layer 2028 may be defined between the combustion product stream 1008 and the inner surface of the inlet conduit 2002 and a transpiration layer 2030 may be defined between the blades 2008 and an inner surface of the inner casing 2020 and the inner casings may be cooled or otherwise protected by the transpiration fluid 2024. In some embodiments the transpiration fluid provided to the turbine may also be provided to the combustor for transpiration cooling. In this regard, for example, the inlet conduit may mate to the combustor such that the transpiration fluid is provided thereto in some embodiments. However, transpiration fluid provided to the combustor may additionally or alternatively be provided from a separate inlet 1026 in some embodiments.

Further, transpiration fluid 2024 may also be introduced into the turbine 2000 through a second inlet 2032, which may be defined in the power shaft 2011 in some embodiments. Accordingly, the transpiration fluid 2024 may travel through the power shaft 2011 into the rotor 2006. The rotor 2006 and/or the blades 2008 may comprise a transpiration material such as a porous sintered material (e.g., a porous sintered metal material) that is configured to receive the transpiration fluid 2024 and transpire the fluid therethrough to outer surfaces thereof. Accordingly, the rotor 2006 and/or the blades 2008 may be cooled or otherwise protected from the combustion product stream 1008 and particulates therein by the transpiration fluid 2024.

FIGS. 5 and 6 illustrate an alternate embodiment of a turbine 2000'. As illustrated, a plurality of combustors 1000' may be configured to drive the turbine 2000'. In particular, the combustors 2000' may be radially disposed with respect to a major axis defined by the rotor 2006', as illustrated in FIG. 6. As shown in FIG. 5, the turbine 2000' may be substantially similar to the embodiment of the turbine 2000 illustrated in FIG. 4, except the combustors 1000' may supply combustion product streams 1008' around the circumference of the rotor 2006'. Accordingly, an annular flow diverter may not be needed to divert the combustion product streams 1008' around the rotor 2006'. Each of the combustors 1000' may be substantially similar to the combustor 1000 described above except for the placement of the combustors around the rotor 2006'.

FIG. 7 illustrates a lateral sectional view through an embodiment of a turbine blade 2008A that may be employed in the turbines disclosed herein. The turbine blade 2008A may comprise an outer layer 3002 and a core 3004. The core 3004 may define a relatively strong metal, or other material configured as a reinforcement member. A strong metal, as used herein, refers to a metal with a strength greater than about 10,000 PSI, greater than about 20,000 PSI or greater than about 30,000 PSI at appropriate elevated temperatures and that is chemically resistant at appropriate temperatures. Examples include stainless steel alloys and high nickel alloys such as Inconel, etc. Thus, the present disclosure allows lower cost alloys such as stainless steel (e.g., 316 stainless steel) or other alloys with lower nickel and cobalt contents to be used instead of the typical superalloys which have relatively very high nickel and cobalt contents, and are thus very expensive. In this regard, a polycrystalline 316 stainless steel can be as much as twenty times less expensive per pound than a polycrystalline superalloy, and two-thousand times cheaper per pound than single crystal superalloy blades.

Further, the core 3004 may define one or more channels 3006. The channels 3006 may be configured to receive transpiration fluid and direct the transpiration fluid into the outer layer 3002. The outer layer 3002 may define a portion, or the entirety, of an exterior surface 3008 of the blade 2008A in some embodiments. Further, the outer layer 3002 may comprise a porous material such as a porous sintered metal material. Accordingly, the channels 3006 in the core 3004 may be configured to receive transpiration fluid and direct the transpiration fluid into the outer layer 3002. Thus, the transpiration fluid may flow through the outer layer 3002 of the turbine blade 2008A and provide a transpiration layer around the exterior surface 3008 of the turbine blade which may protect the turbine blade from heat and/or impacts with particulates. In this regard, it should be understood that a turbine blade and/or other components of the systems disclosed herein may be transpiration protected, meaning a transpiration fluid is directed to at least a portion of a surface thereof, regardless of whether the transpiration cools the component. For example, a component may be transpiration protected by a transpiration fluid that protects a surface of the component from impact with particulates or other matter regardless of the temperature of the transpiration fluid. Conversely, a component may additionally or alternatively be transpiration protected by a transpiration fluid that cools the component or acts as a barrier that reduces heating of the component.

As described above, transpiration fluid may additionally or alternatively be employed in other components associated with the systems and assemblies described herein. In this regard, FIG. 8 illustrates a sectional view through a portion of an inlet conduit 2002A configured to deliver a combustion product stream from a combustor to a turbine. The inlet conduit 2002A may comprise an inner layer 4002 and an outer layer 4004. The outer layer 4004 may comprise a shell, which may comprise a strong metal as described above, configured to provide strength to the inlet conduit 2002A. Further, the outer layer 4004 may define one or more channels 4006. The channels 4006 may be configured to receive transpiration fluid and direct the transpiration fluid into the inner layer 4002. The inner layer 4002 may define a portion, or the entirety, of an inner surface 4008 of the inlet conduit 2002A in some embodiments. Further, the inner layer 4002 may comprise a porous material such as a porous sintered metal material. Accordingly, the channels 4006 in the outer layer 4004 may be configured to receive transpiration fluid and direct the transpiration fluid into the inner layer 4002. Thus, the transpiration fluid may flow through the inner layer 4002 of the inlet conduit 2002A and provide a transpiration layer at the inner surface 4008 of the inlet conduit which may protect the inlet conduit from heat and/or impacts with particulates.

As illustrated in FIG. 9, in one embodiment of an inlet conduit 2002B, an insulation layer 4010 and a second outer layer 4012 may additionally be provided. The insulation layer 4010 and the second outer layer 4012 may surround the inner layer 4002 and the outer layer 4004 in some embodiments. The insulation layer 4010 may insulate the inlet conduit 2002B so as to retain more heat therein, which may increase the efficiency of the system in which it is employed. Further, the second outer layer 4012 may provide additional strength to the inlet conduit 2002B. However, the various material layers and features described above may additionally or alternatively be employed in other components of the systems and assemblies described herein, such as in a combustor.

FIG. 10 illustrates a longitudinal sectional view through a turbine blade 2008B in accordance with an alternate embodiment. The turbine blade 2008B may comprise one or more reinforcement members such as one or more rods 5014. The rods 5014 may comprise a metal material, or other material configured to provide strength to the turbine blade 2008B.

The turbine blade 2008B may further define one or more channels 5006. The channels 5006 may be configured to receive transpiration fluid and direct the transpiration fluid into the material defining the turbine blade 2008B. In this regard, the turbine blade 2008B may comprise a porous material such as a porous sintered metal material. Accordingly, the channels 5006 in the turbine blade 2008B may be configured to receive transpiration fluid and direct the transpiration fluid through the turbine blade to provide a transpiration layer at an outer surface 5008 of the turbine blade which may protect the turbine blade from heat and/or impacts with particulates.

In some embodiments the turbine blade 2008B may be configured to define a flow of transpiration fluid at a leading edge 5016 of the turbine blade that is greater than a flow of the transpiration fluid at a trailing edge 5018 of the turbine blade. This may provide the leading edge with greater protection, which may be desirable since the leading edge may otherwise be more prone to impacts with particles than the remainder of the turbine blade. In this regard, one or more channels 5006 in the turbine blade 2008B may define a transpiration fluid inlet area at the leading edge 5016 (see, e.g., channel 5006A) that is greater than a transpiration fluid inlet area of one or more channels at the trailing edge 5018 (see, e.g., channel 5006B). Alternatively, a greater number of channels may be defined at the leading edge than at the trailing edge.

FIGS. 11-13 illustrate an alternate embodiment of a turbine blade 2008C. As illustrated, the turbine blade 2008C may define an integral structure comprising one or more internal ribs 6020. The internal ribs 6020 may function as a reinforcement member configured to provide strength to the turbine blade 2008C. The internal ribs 6020 may be integrally formed with an outer layer 6002 and/or a base member 6022 of the turbine blade 2008C.

The turbine blade 2008C may include one or more channels 6006 that may be separated by the internal ribs 6020. The channels 6006 may be configured to receive transpiration fluid (e.g., from a rotor to which the base member 6022 attaches) and direct the transpiration fluid through the outer layer 6002. In this regard, the turbine blade 2008C may comprise a porous material such as a porous sintered metal material. Accordingly, the channels 6006 in the turbine blade 2008C may be configured to receive transpiration fluid and direct the transpiration fluid through the outer layer 6002 of the turbine blade to provide a transpiration layer at an outer surface 6008 of the turbine blade which may protect the turbine blade from heat and/or impacts with particulates. As further illustrated, the channels 6006 in the turbine blade 2008C may define a transpiration fluid inlet area at the leading edge 6016 (see, e.g., channel 6006A) that is greater than a transpiration fluid inlet area of one or more channels at the trailing edge 6018 (see, e.g., channel 6006B). Accordingly, in some embodiments the turbine blade 2008C may be configured to define a flow of transpiration fluid at a leading edge 6016 of the turbine blade that is greater than a flow of the transpiration fluid at a trailing edge 6018 of the turbine blade.

FIG. 14 illustrates a lateral cross-sectional view through an additional embodiment of a turbine blade 2008D. As illustrated, the turbine blade 2008D may comprise an outer layer 7002 that defines a wall thickness at the trailing edge 7018 that is greater than a wall thickness at the leading edge 7016. In this regard, the turbine blade 2008D may comprise a porous material such as a porous sintered metal material. Accordingly, transpiration fluid may be directed through the turbine blade 2008D such that it travels through the outer layer 7002 to provide a transpiration layer at an outer surface 7008 of the turbine blade which may protect the turbine blade from heat and/or impacts with particulates. Since the wall thickness of the outer layer 7002 is greater at the trailing edge 7018 than at the leading edge 7016, the turbine blade 2008D may define a flow of transpiration fluid at the leading edge that is greater than a flow of the transpiration fluid at the trailing edge.

Further, the turbine blades in accordance with the various embodiments disclosed herein may define a porosity that varies between the root and tip of a turbine blade (see, e.g., the root 6026 and tip 6028 of the turbine blade 2008C illustrated in FIG. 13). In this regard, in some embodiments the turbine blades disclosed herein may be configured to define a flow of the transpiration fluid at the tip of the turbine blade that is greater than a flow of the transpiration fluid at the root of the turbine blade. This may provide the turbine blades with additional protection which may be desirable since the tip of the turbine blade moves at a greater velocity than any other point on the turbine blade.

For example, FIG. 15A schematically illustrates a longitudinal sectional view through a turbine blade 2008E. As illustrated, the turbine blade 2008E defines a porosity that differs between the root 8026 and the tip 8028. In particular, the turbine blade 2008E is more porous at the tip 8028 than the root 8026 such that relatively more transpiration fluid may flow out of the tip of the turbine blade than the root of the turbine blade. In this regard, the turbine blade 2008E may comprise a porous material such as a porous sintered metal material configured to transpire a transpiration fluid therethrough, as discussed above. As illustrated, in some embodiments the porous material may define a plurality of layers 8030A-D, wherein the porosity of the layers increases from root to tip. The layers 8030A-D may be defined by different materials or by the same material which has been sintered to various extents, and hence the porosity thereof varies. In some embodiments the layers may be laminated together, although the layers may be attached in various other manners.

In another embodiment, as illustrated in FIG. 15B, the turbine blade 2008E' defines a porosity that differs between the root 8026' and the tip 8028', as described above with respect to FIG. 15B. However, as illustrated, in some embodiments the porous material may define a porosity gradient, wherein, for example, the porosity of the material increases from the 8026' to the tip 8028'. In this regard, the porosity of the material may change at various locations without there being distinct layers defining different porosities in some embodiments.

Various other configurations for the turbine blades may be employed. For example, in some embodiments the turbine blades may be configured to define a flow of transpiration fluid at the leading edge that is substantially equal to, or less than, the flow of transpiration fluid at the trailing edge of the turbine blades. Further, in some embodiments the turbine blades may be configured to define a flow of transpiration fluid at the tip that is substantially equal to, or less than, the flow of transpiration fluid at the root of the turbine blade. Further, variations in porosity between the leading edge and trailing edge may also be used to control the flow of transpiration fluid out of the blades in a similar manner as described with respect to controlling transpiration flow between the root and tip.

Thus, for example, the porosity of the material defining the turbine blade (or other component) may increase between the root and tip, decrease between the root and tip, be relatively higher or lower in the center relative to outer portions of the blade, increase or decrease from the leading edge to the trailing edge, etc. The porosity gradient or porosity layers may increase or decrease from about 10% porosity to about 90% porosity, about 25% porosity to about 75% porosity, or about 1% porosity to about 25% porosity.

Accordingly, transpiration fluid may be configured to cool and/or otherwise protect various components of the systems and assemblies disclosed herein. In this regard, FIG. 16 illustrates a calculated trajectory 900 for a 100 μm ash particle 902 relative to an outer surface 904 of a turbine blade 906. The ash particle trajectory 900 is modeled based on the ash particle 902 initially traveling at 75 m/s toward the turbine blade 906 with a flow of $CO_2$ transpiration fluid 908 transpiring from the outer surface 904 of the turbine blade at 2 m/s. Circulating fluid in the turbine may be at 300 Bar (30 MPa) and 700° C. As illustrated, the transpiration fluid 908 prevents the ash particle 902 from coming into contact with the turbine blade 906. In particular, the ash particle 902 is calculated to come about 0.2 mm from the outer surface 904 of the turbine blade. Accordingly, erosion of the turbine blade 906 may be avoided.

Similarly, FIG. 17 illustrates one example according to the present disclosure of a calculated particle trajectory 1000 for a 50 μm ash particle 1002 relative to an inner surface 1004 of a combustor 1006. The ash particle trajectory 1000 is modeled based on the ash particle 1002 initially traveling at a velocity of 50 m/sec perpendicular to the inner surface 1004 of the combustor 1006 with an axial flow velocity of the combustion gas of about three meters per second, a combustion gas composition of over about 90% $CO_2$, a combustion gas temperature of about 1,500° C., a pressure of about 300 Bar (30 MPa), and a radial transpiration flow rate of the transpiration fluid 1008 of about one meter per second in the radial direction, (e.g., perpendicular to the axial combustion gas flow). As illustrated, the transpiration fluid 1008 prevents the ash particle 1002 from coming into contact with the inner surface 1004 of the combustor 1006. The ash particle 1002 is calculated to come only about 0.2 mm from the inner surface 1004 of the combustor 1006. Accordingly, erosion of the inner surface 1004 of the combustor 1006 may be avoided.

Table 1 below provides various parameters for operation of a conventional power plant natural gas turbine design. A cross-section of such typical turbine 1100 is shown in FIG. 18. As a comparative, Table 2 below provides the same parameters for operation of a high pressure, low velocity turbine according to the present disclosure. A cross-section of an exemplary turbine 1200 according to the disclosure is shown in FIG. 19. As may be seen by comparing the conventional turbine 1100 to the turbine 1200 of the present disclosure, the turbine of the present disclosure may define a relatively smaller diameter due to the turbine of the present disclosure employing relatively shorter turbine blades 2008F as compared to the turbine blades 1108 of the conventional turbine in some embodiments. In this regard, as shown in the following tables, the turbine blades 2008F of the turbine 1200 of the present disclosure may define a relatively smaller average inner radius (i.e., from the center of the rotor 2006F to the root of the turbine blade), average outer radius (i.e., from the center of the rotor to the tip of the turbine blade), and average radius (average of the inner and outer radii) as compared to the turbine blades 1108 of the conventional turbine 1100 in some embodiments. Also, the turbine 1200 of the present disclosure may define a relatively greater length to diameter ratio as compared to the conventional turbine 1100. Further, the turbine 1200 of the present disclosure may include a relatively larger number of turbine blades 2008F than the conventional turbine 1100. Additionally, the diameter of the rotor 2006F of the turbine 1200 of the present disclosure may be less than the diameter of the rotor 1106 of the conventional turbine 1100.

TABLE 1

| Conventional Design | |
| --- | --- |
| Parameter | Value |
| Electrical Generator Power Requirement | $2.5 \times 10^8$ W |
| Turbine Inlet Pressure | 15 bars (1.5 MPa) |
| Turbine Outlet Pressure | 1 bar (0.1 MPa) |
| Combustion Product Flow Temperature | 1,623 K (1,350° C.) |
| Flow Density | 0.75 kg/m³ |
| Flow Velocity | 700 mph (310 m/s) |
| Turbine Length | 10 m |
| Turbine Diameter | 4 m |
| Number of blades | 200 |

TABLE 2

| Inventive Design | |
| --- | --- |
| Parameter | Value |
| Electrical Generator Power Requirement | $2.5 \times 10^8$ W |
| Turbine Inlet Pressure | 300 bars (30 MPa) |
| Turbine Outlet Pressure | 30 bar (3 MPa) |
| Combustion Product Flow Temperature | 1,400 K (1,127° C.) |
| Flow Density | 70 kg/m³ |
| Flow Velocity | 100 mph (44 m/s) |

TABLE 2-continued

| Inventive Design | |
|---|---|
| Parameter | Value |
| Turbine Length | 5 m |
| Turbine Diameter | 1.5 m |
| Number of blades | 1,000 |

Many modifications and other embodiments of the disclosure set forth herein will come to mind to one skilled in the art to which the disclosure pertains having the benefit of the teachings presented in the foregoing descriptions. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A turbine assembly comprising:

a casing defining an inlet in fluid communication with a combustor and configured to receive a combustion product stream; and a plurality of blades each extending radially outwardly from a root to a tip, wherein a flow velocity of the combustion product stream is measured proximate the inlet of the turbine assembly and downstream of the combustor, wherein a flow density of the combustion product stream is at least 100 kilograms per cubic meter.

2. The turbine assembly of claim 1, where a blade height of each of the plurality of blades is less than 0.275 m.

3. The turbine assembly of claim 1, wherein the turbine assembly comprises less than 2,000 of the plurality of blades.

4. The turbine assembly of claim 1, where an overall length is less than 11 meters.

5. The turbine assembly of claim 1, wherein an overall length is in a range of from 6 meters (m) to 10 m.

6. The turbine assembly of claim 1, where an average turbine diameter is in a range of from 0.25 m to 3 m.

7. The turbine assembly of claim 1, where an average blade radius is less than 1.2 m.

8. The turbine assembly of claim 1, where the flow velocity of the combustion product stream is less than 400 miles per hour.

9. The turbine assembly of claim 1, further comprising an outlet of the casing for release of a turbine discharge stream, and a rotor positioned in the casing.

10. The turbine assembly of claim 1, where the blade velocity at the tip is in a range of from 20 meters per second (m/s) to 340 m/s.

11. The turbine assembly of claim 1, where a turbine inlet pressure is at least 100 bar.

12. The turbine assembly of claim 1, where a turbine inlet pressure is in a range of from 100 bar to 450 bar.

13. The turbine assembly of claim 1, where a turbine outlet pressure is at least 10 bar.

14. The turbine assembly of claim 1, where a turbine outlet pressure is in a range of from 10 bar to 50 bar.

15. The turbine assembly of claim 1, where a ratio of a turbine inlet pressure to a turbine outlet pressure is at least 6.

16. The turbine assembly of claim 1, where a ratio of a turbine inlet pressure to a turbine outlet pressure is in a range of from 6 to 15.

17. The turbine assembly of claim 1, where a high temperature for high temperature combustion for the combustor is at least 1000 degrees Celsius (C).

18. The turbine assembly of claim 1, where a high temperature for high temperature combustion for the combustor is in a range of from 1200° C. to 3000° C.

* * * * *